United States Patent
Sasaki et al.

(10) Patent No.: US 11,492,037 B2
(45) Date of Patent: Nov. 8, 2022

(54) CONTROL DEVICE FOR POWER STEERING DEVICE

(71) Applicant: HITACHI AUTOMOTIVE SYSTEMS, LTD., Hitachinaka (JP)

(72) Inventors: Mitsuo Sasaki, Hadano (JP); Makoto Goto, Isehara (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 1092 days.

(21) Appl. No.: 16/084,860

(22) PCT Filed: Jan. 20, 2017

(86) PCT No.: PCT/JP2017/001907
§ 371 (c)(1),
(2) Date: Sep. 13, 2018

(87) PCT Pub. No.: WO2017/159037
PCT Pub. Date: Sep. 21, 2017

(65) Prior Publication Data
US 2019/0054952 A1    Feb. 21, 2019

(30) Foreign Application Priority Data

Mar. 15, 2016 (JP) .............................. JP2016-050863

(51) Int. Cl.
*B62D 5/04* (2006.01)
*B62D 3/12* (2006.01)
(Continued)

(52) U.S. Cl.
CPC ............ *B62D 5/0481* (2013.01); *B62D 3/12* (2013.01); *B62D 5/046* (2013.01); *B62D 5/0421* (2013.01);
(Continued)

(58) Field of Classification Search
CPC ........ B62D 6/10; B62D 5/0421; B62D 5/046; B62D 5/0463; B62D 5/0472;
(Continued)

(56) References Cited

U.S. PATENT DOCUMENTS 5,554,806 A * 9/1996 Mizuno ................... G01P 1/023
 73/493
7,233,850 B2 * 6/2007 Nakano .................. B62D 6/008
 180/413

(Continued)

FOREIGN PATENT DOCUMENTS

CN    104884333 B * 6/2017 ............. B62D 5/001
CN    107249966 A * 10/2017 ......... B62D 15/0235
(Continued)

OTHER PUBLICATIONS

Dahlke F. New Requirements and Solutions in Brake Development—Maximization of electric brake torque through hybrid adaptive model control. In: Pfeffer P. (eds) 7th International Munich Chassis Symposium 2016. Proceedings. Springer Vieweg, Wiesbaden. https://doi.org/10.1007/978-3-658-14219-3_49 (Year: 2016).*

(Continued)

*Primary Examiner* — Cuong H Nguyen
(74) *Attorney, Agent, or Firm* — Foley & Lardner LLP

(57) ABSTRACT

Provided is a control device (14) for a power steering device including a steering mechanism (1) configured to transmit rotation of a steering wheel to a steered wheel, and an electric motor (13) configured to apply a steering force to the steering mechanism. The control device includes: a command signal calculation part (61) configured to calculate a motor command signal (Io) for control of driving of the electric motor, based on a state of steering of the steering wheel, and output the command signal to the electric motor; a vibration signal receiving part (69) configured to receive a vibration signal of the power steering device; and an abnor- (Continued)

mality determination part (63) configured to determine whether or not the power steering device is abnormal, based on a Y-axis acceleration signal (Gy) received by the vibration signal reception part.

13 Claims, 27 Drawing Sheets

(51) Int. Cl.
    *B62D 6/00*     (2006.01)
    *F16H 57/01*     (2012.01)
    *F16H 57/00*     (2012.01)
    *H02P 29/024*     (2016.01)
    *F16H 57/02*     (2012.01)

(52) U.S. Cl.
    CPC .......... *B62D 5/0424* (2013.01); *B62D 5/0463* (2013.01); *B62D 6/00* (2013.01); *F16H 57/00* (2013.01); *F16H 57/01* (2013.01); *B62D 5/0445* (2013.01); *F16H 2057/02034* (2013.01); *H02P 29/024* (2013.01)

(58) Field of Classification Search
    CPC .......... B62D 5/0484; B62D 3/12; B62D 6/00; B62D 5/0481; B62D 5/0424; B62D 5/0445; F16H 57/01; F16H 57/00; F16H 2057/02034; H02P 29/024
    USPC ............ 701/41–42; 318/434; 180/443
    See application file for complete search history.

(56) References Cited

U.S. PATENT DOCUMENTS

| | | | | |
|---|---|---|---|---|
| 8,272,474 | B2* | 9/2012 | Mori | B62D 5/0469 |
| | | | | 180/443 |
| 9,308,934 | B2* | 4/2016 | Aoki | B62D 5/0463 |
| 9,346,486 | B2* | 5/2016 | Itamoto | B62D 5/0463 |
| 9,533,703 | B2* | 1/2017 | Shimizu | F16D 41/06 |
| 2003/0069676 | A1* | 4/2003 | Kanda | B62D 6/007 |
| | | | | 701/41 |
| 2004/0148078 | A1* | 7/2004 | Nakano | B62D 6/008 |
| | | | | 701/41 |
| 2005/0017947 | A1* | 1/2005 | Shahoian | G06F 3/0338 |
| | | | | 345/156 |
| 2006/0288800 | A1* | 12/2006 | Mukai | B62D 5/049 |
| | | | | 73/862.326 |
| 2008/0067960 | A1* | 3/2008 | Maeda | B62D 5/046 |
| | | | | 180/443 |
| 2008/0306649 | A1* | 12/2008 | Im | B60G 17/015 |
| | | | | 701/29.5 |
| 2010/0082274 | A1* | 4/2010 | Son | G01H 1/00 |
| | | | | 702/56 |
| 2013/0218403 | A1* | 8/2013 | Abe | B60R 16/03 |
| | | | | 701/32.8 |
| 2013/0320905 | A1* | 12/2013 | Uryu | B62D 5/0403 |
| | | | | 318/490 |
| 2014/0180544 | A1* | 6/2014 | Itamoto | B62D 5/0463 |
| | | | | 701/41 |
| 2014/0297122 | A1* | 10/2014 | Kouchi | B62D 6/04 |
| | | | | 701/41 |
| 2015/0298726 | A1* | 10/2015 | Aoki | B62D 5/049 |
| | | | | 701/43 |
| 2015/0360715 | A1* | 12/2015 | Shimizu | F16D 41/064 |
| | | | | 701/43 |
| 2016/0001815 | A1 | 1/2016 | Sasaki | |
| 2016/0200324 | A1* | 7/2016 | Suzuki | B60W 10/08 |
| | | | | 701/22 |
| 2017/0237377 | A1* | 8/2017 | Furukawa | H02P 29/00 |
| | | | | 318/564 |

FOREIGN PATENT DOCUMENTS

| | | | | |
|---|---|---|---|---|
| EP | 2900542 B1 | * | 5/2016 | .......... B62D 5/0463 |
| EP | 2749477 B1 | * | 11/2017 | .......... B62D 5/0463 |
| JP | 2004-243900 A | | 9/2004 | |
| JP | 2008-037255 A | | 2/2008 | |
| JP | 2014-234102 A | | 12/2014 | |
| JP | 2015-229380 A | | 12/2015 | |
| WO | WO-2014115014 A1 | * | 7/2014 | .......... B62D 5/0463 |
| WO | WO-2014/148086 A1 | | 9/2014 | |

OTHER PUBLICATIONS

I. Miyashita, A. Imayanagida and T. Koga, "Recent industrial application of speed sensorless vector control in Japan," Proceedings of IECON'94—20th Annual Conference of IEEE Industrial Electronics, 1994, pp. 1573-1578 vol. 3, doi: 10.1109/IECON.1994. 398049 (Year: 1994).*
H. Du, N. Zhang and G. Dong, "Stabilizing Vehicle Lateral Dynamics With Considerations of Parameter Uncertainties and Control Saturation Through Robust Yaw Control," in IEEE Transactions on Vehicular Technology, vol. 59, No. 5, pp. 2593-2597, Jun. 2010, doi: 10.1109/TVT.2010.2045520. (Year: 2010).*
Lenzo, B., Sorniotti, A., Gruber, P. et al. On the experimental analysis of single input single output control of yaw rate and sideslip angle. Int.J Automot. Technol. 18, 799-811 (2017). https://doi.org/10.1007/s12239-017-0079-4. (Year: 2017).*
L.-W. Chen and H.-M. Chen, "Driver Behavior Monitoring and Warning With Dangerous Driving Detection Based on the Internet of Vehicles," in IEEE Transactions on Intelligent Transportation Systems, vol. 22, No. 11, pp. 7232-7241, Nov. 2021, doi: 10.1109/TITS.2020.3004655 (Year: 2020).*
Y. Fan, F. Gu, J. Wang, J. Wang, K. Lu and J. Niu, "SafeDriving: An Effective Abnormal Driving Behavior Detection System based on EMG Signals," in IEEE Internet of Things Journal, doi: 10.1109/JIOT.2021.3135512 (Year: 2021).*
D. Capriglione, M. Carratù, A. Pietrosanto and P. Sommella, "Soft Sensors for Instrument Fault Accommodation in Semiactive Motorcycle Suspension Systems," in IEEE Transactions on Instrumentation and Measurement, vol. 69, No. 5, pp. 2367-2376, May 2020, doi: 10.1109/TIM.2019.2963552 (Year: 2020).*
S. Dutta, B. Basu and F. A. Talukdar, "Classification of Induction Motor Fault and Imbalance Based on Vibration Signal Using Single Antenna's Reactive Near Field," in IEEE Transactions on Instrumentation and Measurement, vol. 70, pp. 1-9, 2021, Art No. 3524209, doi: 10.1109/TIM.2021.3108230 (Year: 2021).*

* cited by examiner

CONTROL DEVICE FOR POWER STEERING DEVICE

TECHNICAL FIELD

The present invention relates to a power steering device control device for application to a vehicle.

BACKGROUND ART

A patent document 1 discloses a known conventional power steering device control device as follows.

This control device is applied to a power steering device which includes: a steering mechanism configured to transmit rotation of a steering wheel to a steered wheel; an electric motor configured to apply an assist steering force to the steering mechanism; a housing accommodating the steering mechanism; and a water detection part disposed in a lower part of an interior of the housing, and configured to detect water entering the interior of the housing. The control device is connected electrically to the water detection part, and configured to determine that the power steering device is in an abnormal state where water enters the interior of the housing, in response to reception of a signal from the water detection part, wherein the signal is indicative of detection of water.

PRIOR ART DOCUMENT(S)

Patent Document(s)

Patent Document 1: JP 2014-234102 A

SUMMARY OF THE INVENTION

Problem(s) to be Solved by the Invention

In recent years, there is increasing demand for abnormality determination of power steering devices, in order to enhance safety of vehicles. For abnormality determination, it has been desired that other various methods than the method of the control device described above will be proposed in conformance with specifications and configuration of power steering devices.

The present invention has been made to satisfy the foregoing desire, and is targeted for providing a power steering device control device capable of detecting an abnormality of a power steering device based on a vibration occurring in the power steering device.

Means for Solving the Problem(s)

According to the present invention, a power steering device control device for a power steering device, the power steering device including: a steering mechanism configured to transmit rotation of a steering wheel to a steered wheel; and an electric motor configured to apply a steering force to the steering mechanism; the power steering device control device comprises: a command signal calculation part configured to: calculate a command signal for control of driving of the electric motor, based on a state of steering of the steering wheel; and output the command signal to the electric motor; a vibration signal receiving part configured to receive input of a signal of vibration of the power steering device; and an abnormality determination part configured to determine whether or not the power steering device is abnormal, based on the signal of vibration of the power steering device received by the vibration signal receiving part.

EFFECT(S) OF THE INVENTION

The present invention makes it possible to detect an abnormality of a power steering device based on a vibration occurring in the power steering device.

BRIEF DESCRIPTION OF THE DRAWINGS

FIG. 19A shows the vibration level when a steering wheel is steered at a steering speed of 90 degrees per second, and FIG. 19B shows the vibration level when the steering wheel is steered at a steering speed of 360 degrees per second.

MODE(S) FOR CARRYING OUT THE INVENTION

The following describes power steering device control devices according to embodiments of the present invention with reference to the drawings.

First Embodiment

First, the following describes basic configuration of a control device and a power steering device to which the control device is applied, according to the present embodiment, with reference to FIGS. 1 to 6.

Figure 1:
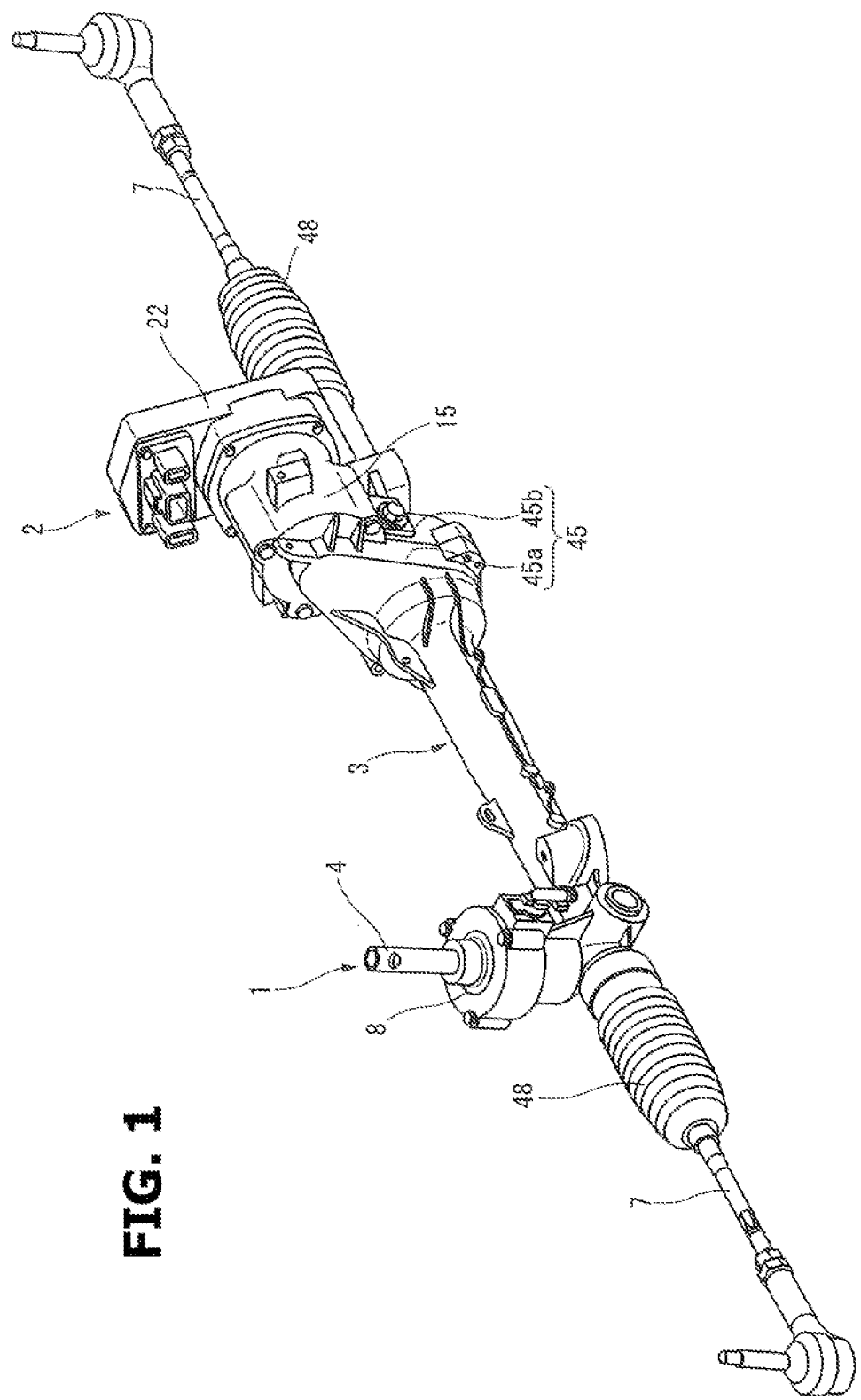
FIG. 1 is a perspective view of a power steering device according to a first embodiment of the present invention.
Figure 2:
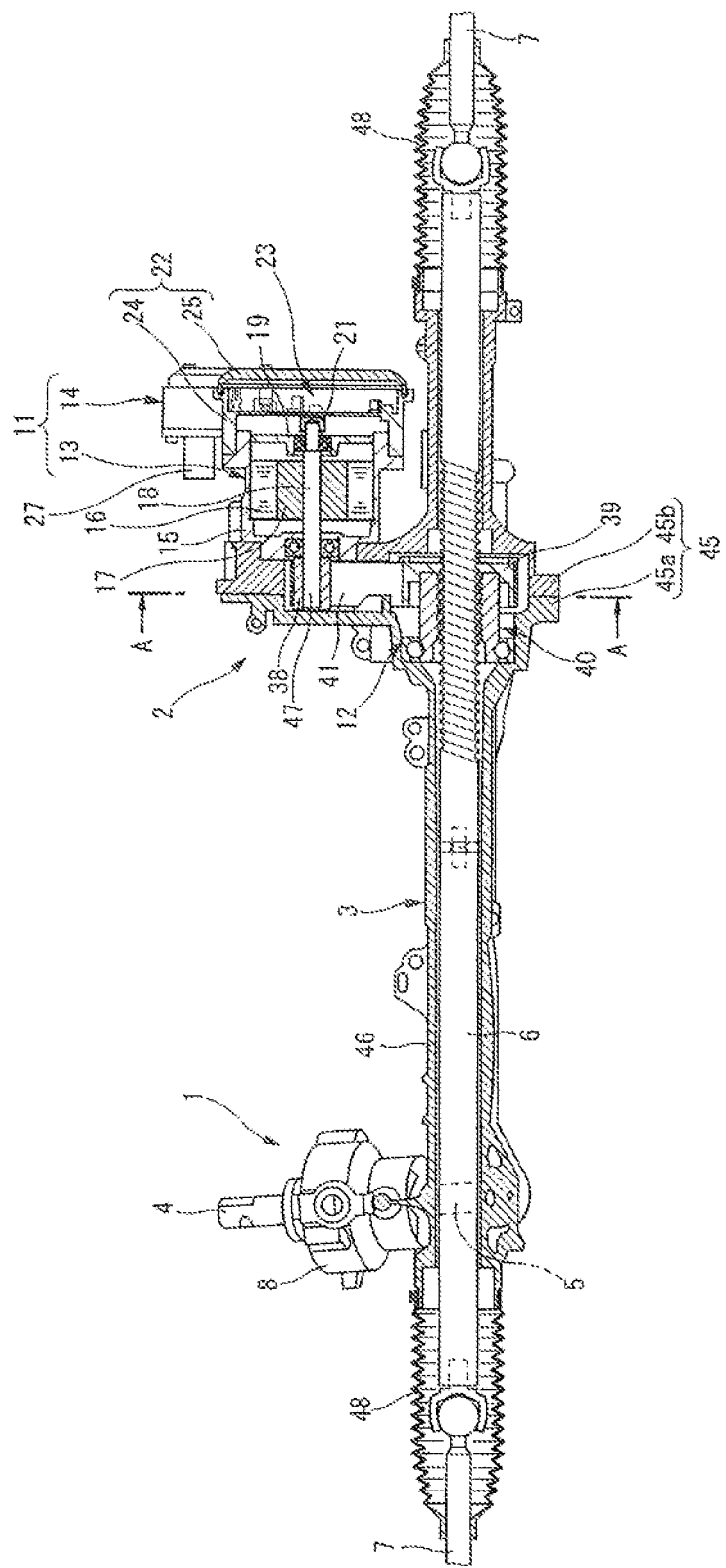
FIG. 2 is a longitudinal sectional view of the power steering device.

As shown in FIGS. 1 and 2, the power steering device according to the present embodiment includes a steering mechanism 1, a steering assist mechanism 2, and a housing 3, wherein steering mechanism 1 is configured to transmit rotation of a steering wheel not shown to steered wheels not shown, wherein steering assist mechanism 2 is configured to assist steering operation of a driver by applying a steering assist force to steering mechanism 1, based on information about steering and others, and wherein housing 3 accommodates at least part of steering mechanism 1 and part of steering assist mechanism 2.

Steering mechanism 1 generally includes an input shaft 4, a pinion shaft 5, and a rack shaft 6, wherein input shaft 4 includes a first end side linked to the steering wheel in a manner to rotate integrally with the steering wheel, wherein pinion shaft 5 includes a first end side coupled to input shaft 4 via a torsion bar not shown in a manner to rotate with respect to input shaft 4, and wherein rack shaft 6 includes an outer periphery formed with rack teeth not shown meshed with pinion teeth not shown, and is configured to travel in a vehicle lateral direction, namely, in an axial direction of rack shaft 6. Rack shaft 6 includes end portions linked to the steered wheels via tie rods 7, 7, knuckle arms not shown, etc., respectively, and is configured to change orientation of each steered wheel by pulling the corresponding knuckle arm by axial movement of rack shaft 6, in response to driver's steering operation of the steering wheel.

A torque sensor 9 (see FIG. 7) and a steering angle sensor 10 (see FIG. 7) are provided in a sensor housing 8 accommodating the input shaft 4 and pinion shaft 5, wherein torque sensor 9 is configured to sense a steering torque in steering mechanism 1 which is caused by driver's steering operation, and wherein steering angle sensor 10 is configured to sense a steering angle that is a quantity of rotation of the steering wheel from its neutral position.

Torque sensor 9 is configured to calculate the steering torque, based on a relative rotation angle between input shaft 4 and pinion shaft 5 due to torsion of the torsion bar, and is attached to input shaft 4 in a manner to rotate integrally with input shaft 4, wherein input shaft 4 is disposed closer to the steering wheel than the torsion bar, in a steering force transmission line from the steering wheel to rack shaft 6. Torque sensor 9 includes main and auxiliary torque sensing parts 9a, 9b in pairs, and is configured to obtain main and auxiliary steering torque values by main and auxiliary torque sensing parts 9a, 9b, and thereafter output main and auxiliary steering torque signals Tr(Main), Tr(Sub) indicative of the main and auxiliary steering torque values to a control device 14 described below.

Steering angle sensor 10 includes main and auxiliary steering angle sensing parts 10a, 10b in pairs, and is configured to obtain main and auxiliary steering angle values by main and auxiliary steering angle sensing parts 10a, 10b, and thereafter output main and auxiliary steering angle signals θs(Main), θs(Sub) indicative of the main and auxiliary steering angle values to control device 14.

Figure 3:
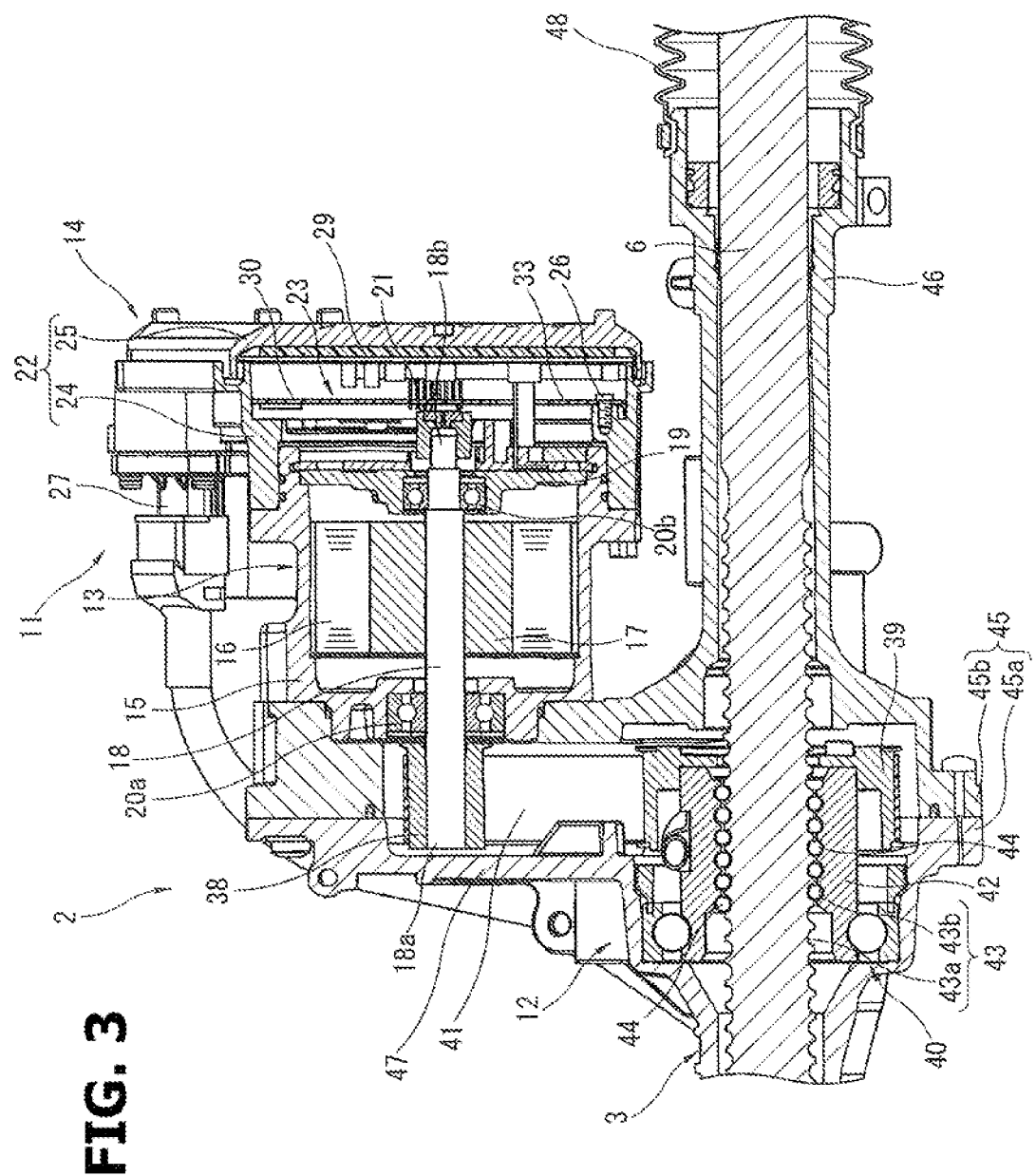
FIG. 3 is an enlarged longitudinal sectional view of a steering assist mechanism of the power steering device.

As shown in FIGS. 2 and 3, steering assist mechanism 2 includes: a motor unit 11 configured to output a steering assist force, depending on a result of sensing of torque sensor 9 and steering angle sensor 10; and a transmission mechanism 12 configured to transmit the steering assist force (torque) to rack shaft 6 while converting the steering assist force into an axial moving force of rack shaft 6 with speed reduction.

Motor unit 11 is an integral unit of an electric motor 13 and a control device 14, wherein electric motor 13 is configured to rotate an input pulley 38 described below, and thereby apply the steering assist force to rack shaft 6 via transmission mechanism 12, and wherein control device 14 is attached to electric motor 13, and is configured to control driving of electric motor 13 depending on parameters such as torque signal Tr and vehicle speed.

Electric motor 13 is a so-called three-phase induction motor driven by three-phase alternating current power, and includes: a motor housing 15 having a cylindrical tubular shape having a bottom, wherein an open end of motor housing 15 is closed by an end wall 19; a stator 16 having a cylindrical shape fixed to an inner peripheral surface of motor housing 15 by press-fit or the like; a rotor 17 having a cylindrical shape disposed radially inside the stator 16 with a small clearance therebetween; and a drive shaft 18 fixed to an inner periphery of rotor 17 in a manner to rotate integrally with rotor 17, and configured to output rotation of rotor 17 to the outside.

Motor housing 15 is bolted to a transmission mechanism housing part 47 described below with its bottom side engaged in an opening of transmission mechanism housing part 47, wherein transmission mechanism housing part 47 is a part of housing 3.

As shown in FIG. 3, drive shaft 18 includes a first end portion 18a and a second end portion 18b, wherein first end portion 18a is farther from control device 14, and is rotatably supported by a first ball bearing 20a, and projects inside the transmission mechanism housing part 47, wherein first ball bearing 20a is provided at a bottom wall of motor housing 15, and wherein second end portion 18b is rotatably supported by a second ball bearing 20b, and projects inside a control housing 22 described below, wherein second ball bearing 20b is provided at end wall 19. A permanent magnet 21 is attached to second end portion 18b of drive shaft 18, and is employed for sensing the rotation angle of electric motor 13.

Figure 4:
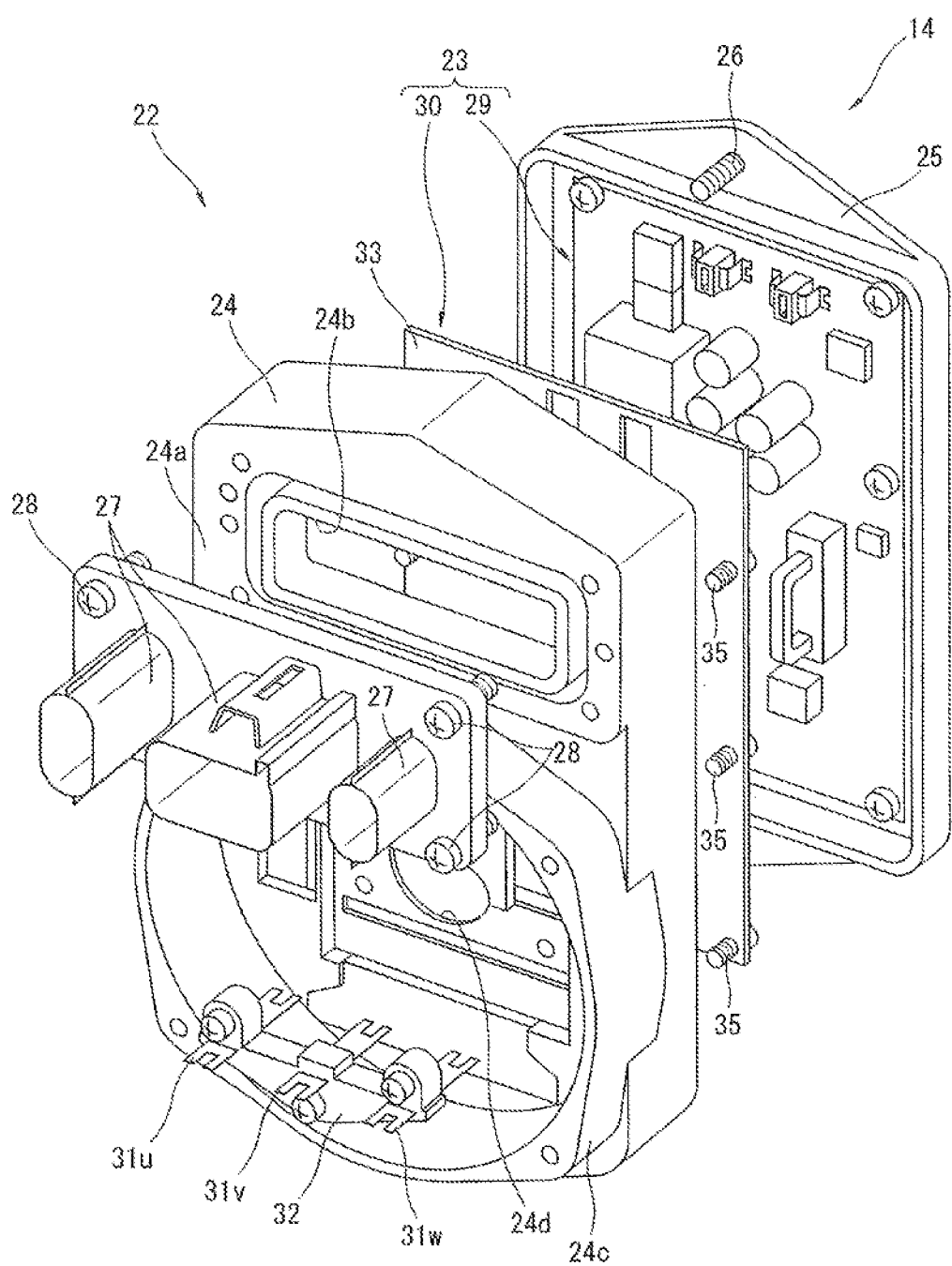
FIG. 4 is an exploded perspective view showing a control device according to the first embodiment.
Figure 5:
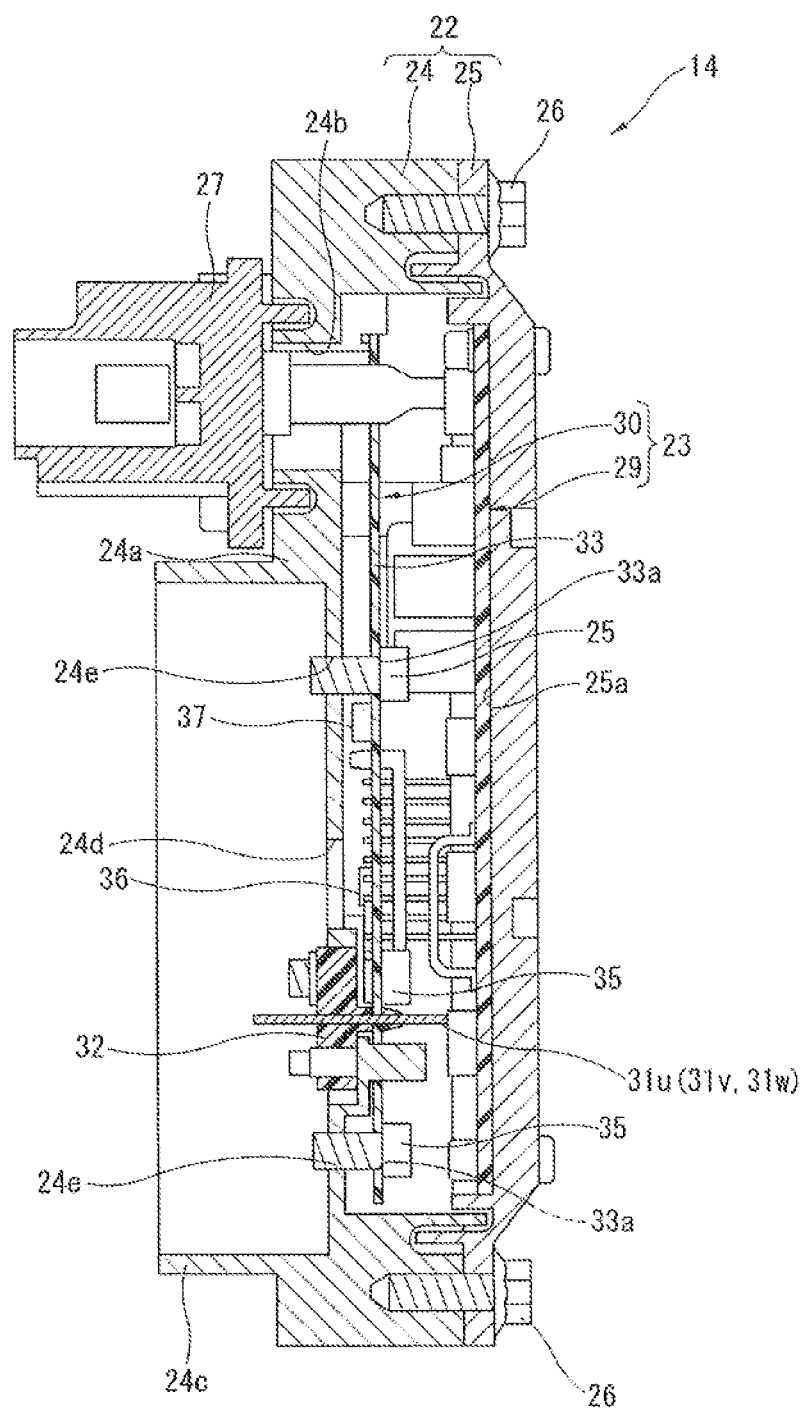
FIG. 5 is a longitudinal sectional view of the control device.

As shown in FIGS. 4 and 5 in particular, control device 14 includes control housing 22, and a control circuit 23 housed inside the control housing 22, and employed to control driving of electric motor 13.

Control housing 22 includes: a case member 24 having a rectangular box shape having an open end at a side farther from electric motor 13; and a cover member 25 fixed to the open end of case member 24 by a bolt 26, closing the opening of case member 24.

Case member 24 includes a through hole 24b at an upper end side of a bottom wall 24a in its vertical direction, wherein through hole 24b extends through case member 24, and has a rectangular cross-section. An external connector 27 is fastened by a plurality of bolts 28 to an end portion of through hole 24b closer to electric motor 13, for connection of torque sensor 9, steering angle sensor 10, a battery VB (see FIG. 7), etc., to control circuit 23.

Case member 24 includes a tubular portion 24c at a lower part of an outer end surface of bottom wall 24a in its vertical direction, wherein tubular portion 24c has a cylindrical tubular shape. Tubular portion 24c is formed to have an inside diameter greater slightly than an outside diameter of an open end portion of motor housing 15, and is fixed to motor housing 15 while being engaged with the open end portion of motor housing 15. A portion of bottom wall 24a surrounded by tubular portion 24c includes a communication hole 24d that extends through and communicates the inside of motor housing 15 with the inside of control housing 22.

Control circuit 23 includes: a power module 29 configured to generate three-phase alternating currents based on electric power supplied from battery VB, wherein the generated three-phase alternating currents are supplied to electric motor 13; and a control module 30 configured to control driving of switching elements not shown of power module 29 such as MOS-FETs.

Power module 29 is attached to an inner end surface 25a of cover member 25 of control housing 22, wherein cover member 25 serves as a heat sink. Power module 29 is connected to a first end portion of each of three current output terminals 31u, 31v, 31w for outputting three-phase alternating currents generated by power module 29. Each current output terminal 31u, 31v, 31w is retained by a terminal holding part 32 made of a nonconductive resin material, and includes a second end portion connected to stator 16 of electric motor 13 through a corresponding one of three bus bars not shown.

Control module 30 is formed by: arranging a conductive pattern not shown on each of front and back surfaces of a substrate 33, wherein substrate 33 is made of a nonconductive resin material such as glass epoxy resin; and mounting many electrical components such as a microcomputer 34 on the conductive pattern.

Substrate 33 includes a plurality of fixing holes 33a at its outer peripheral part, wherein each fixing hole 33a has a circular cross-section, and serves as a fixing portion. Substrate 33 is fixed in proximity of bottom wall 24a by inserting each of a plurality of screws 35 through the corresponding fixing hole 33a, and screwing the same in a corresponding one of a plurality of screw holes 24e formed in bottom wall 24a of case member 24.

Microcomputer 34 is configured to perform various operations, such as an operation of calculating a motor command signal for control of electric motor 13, and a failsafe operation when the power steering device becomes abnormal.

A motor rotation angle sensor 35, and an acceleration sensor 37 are mounted on substrate 33 as well as microcomputer 34, wherein motor rotation angle sensor 36 is employed to sense the rotation angle of electric motor 13, and wherein acceleration sensor 37 is employed to sense a vibration occurring in housing 3 (control housing 22) of the power steering device.

Figure 7:
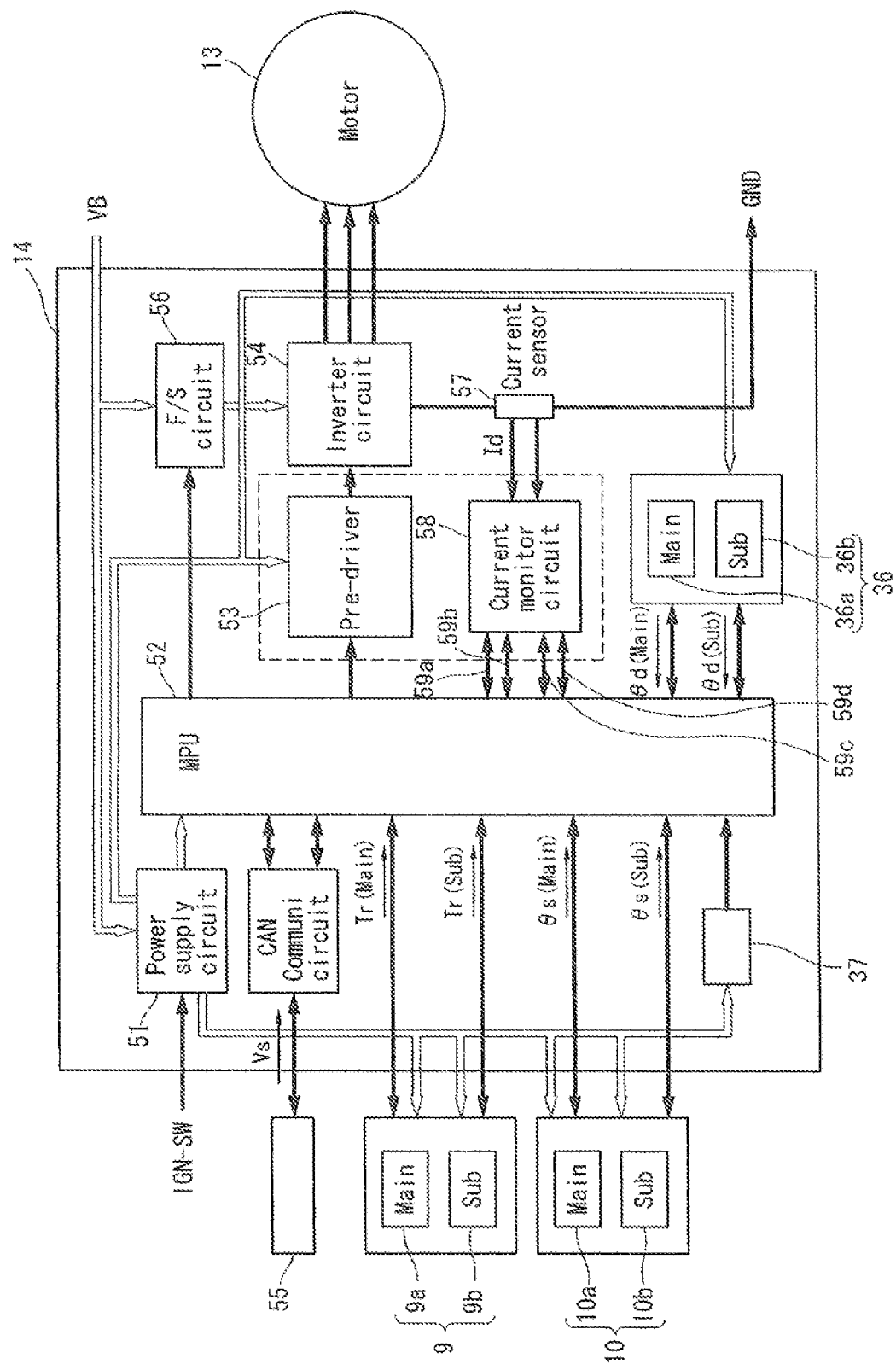
FIG. 7 is a block diagram showing configuration of an electrical system of the control device according to the first embodiment.

Motor rotation angle sensor 36 includes main and auxiliary motor rotation angle sensing parts 36a, 36 in pairs, each of which is a Hall-effect element capable of sensing changes of magnetic flux density (see FIG. 7). Motor rotation angle sensor 36 is mounted on a portion of an end surface of substrate 33 closer to electric motor 13, wherein the portion faces a permanent magnet 21 of drive shaft 18 through communication hole 24d of case member 24, and is configured to sense the rotation angle of electric motor 13 (henceforth referred to as motor rotation angle) based on changes of the magnetic flux density generated by permanent magnet 21, and thereafter output main and auxiliary motor rotation angle signals θd(Main), θd(Sub) indicative of sensed values of the motor rotation angle to microcomputer 34 through the conductive pattern on substrate 33.

As shown in FIG. 5, acceleration sensor 37 is located adjacent to, namely, in proximity of, a specific one of fixing holes 33a of substrate 33. The phrase "adjacent to fixing hole 33a" means that no electric component is arranged between acceleration sensor 37 and fixing hole 33a of substrate 33, wherein the conductive pattern may include a part between acceleration sensor 37 and fixing hole 33a of substrate 33.

Acceleration sensor 37 is configured as an AC acceleration sensor to sense a dynamic acceleration caused by a dynamic phenomenon, namely, an AC component of acceleration, without sensing a static acceleration such as an acceleration due to gravity, or an acceleration during uniform motion, namely, a DC component of acceleration (0 Hz component of vibration).

Acceleration sensor 37 is configured to sense a vibration occurring in housing 3 of the power steering device in three-axis components form, namely, sense a component of acceleration in a vehicle longitudinal direction as an X-axis acceleration component, a component of acceleration in the vehicle lateral direction (in the direction of travel of rack shaft 6) as a Y-axis acceleration component, and a component of acceleration in a vehicle vertical direction as a Z-axis acceleration component. Acceleration sensor 37 is configured to output an X-axis acceleration signal Gx, a Y-axis acceleration signal Gy, and a Z-axis acceleration signal Gz indicative of the corresponding sensed acceleration components to microcomputer 34.

Figure 6:
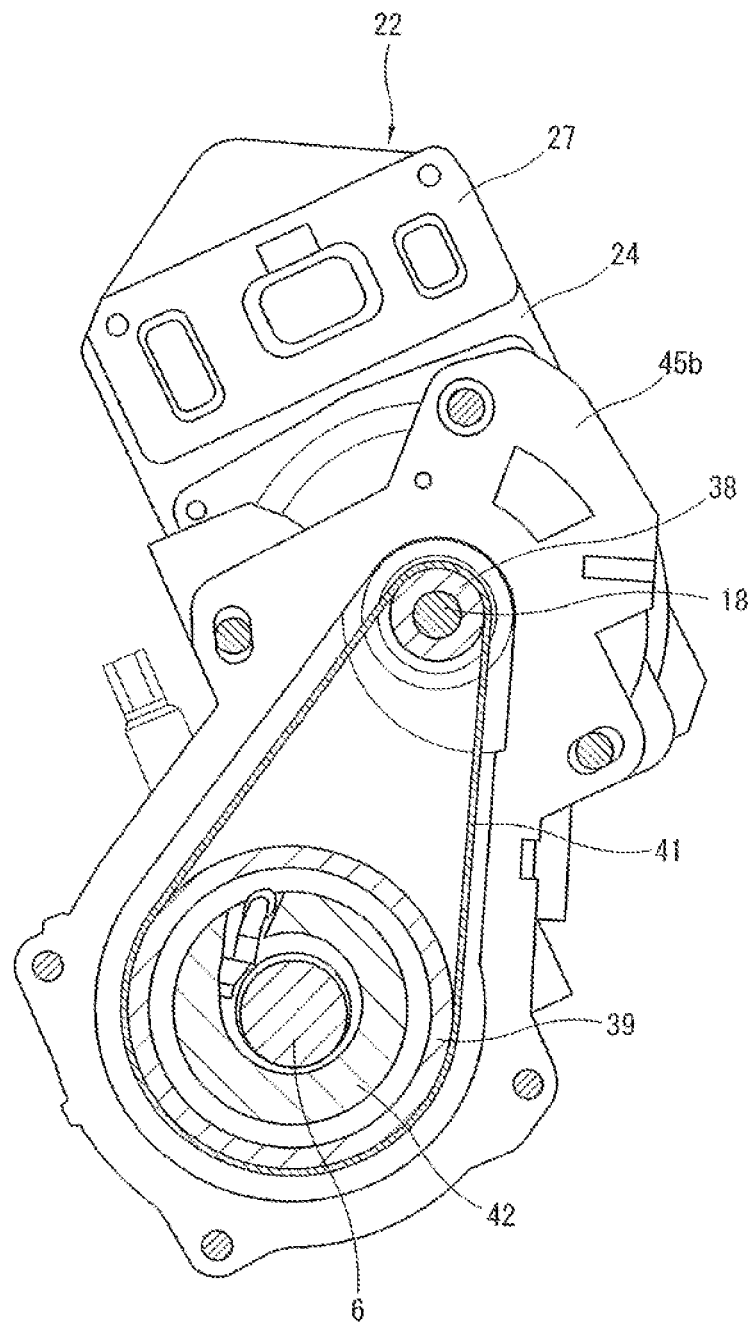
FIG. 6 is a sectional view taken along a line A-A in FIG. 2.

As shown in FIGS. 2, 3 and 6, transmission mechanism 12 includes: input pulley 38 press-fitted in a first end portion 18a of drive shaft 18 of electric motor 13 in a manner to rotate about an axis of drive shaft 18; an output pulley 39 provided at the outer periphery of rack shaft 6 in a manner to rotate with respect to rack shaft 6, and configured to rotate about an axis of rack shaft 6 based on a torque of input pulley 38; a ball screw mechanism 40 disposed between output pulley 39 and rack shaft 6, and configured to convert rotation of output pulley 39 into axial movement of rack shaft 6 with speed reduction; and a belt 41 wound over the input and output pulleys 38, 39, and configured to serve for synchronized rotation of input and output pulleys 38, 39.

As shown in FIG. 3 in particular, ball screw mechanism 40 includes: a nut 42 made of an iron-based metal material to have a tubular shape surrounding the rack shaft 6, and configured to rotate with respect to rack shaft 6; a ball circulation groove 43 including a shaft-side ball screw groove 43a formed in the outer periphery of rack shaft 6 to have a spiral shape, and a nut-side ball screw groove 43b formed in an inner periphery of nut 42 to have a spiral shape; a plurality of balls 44 made of an iron-based metal material, and configured to roll in ball circulation groove 43; and a circulation mechanism not shown for circulating each ball 44 from a first end side of ball circulation groove 43 to a second end side of ball circulation groove 43.

As shown in FIGS. 1 to 3, housing 3 generally includes: a gear housing 45 accommodating the rack shaft 6 and transmission mechanism 12; motor housing 15; and control housing 22.

Gear housing 45 is composed integrally of first and second gear housing forming parts 45a, 45b separated in the vehicle lateral direction, with respect to transmission mechanism 12. Gear housing 45 includes a rack shaft housing part 46 and a transmission mechanism housing part 47, wherein rack shaft housing part 46 accommodates rack shaft 6, and transmission mechanism housing part 47 accommodates transmission mechanism 12.

Rack shaft housing part 46 includes end portions each of which has an opening and receives attachment of a boot 48, wherein each boot 48 is formed of a resin material or the like to have an accordion-fold shape, and serves to suppress entrance of rainwater and others into housing 3.

Transmission mechanism housing part 47 has an opening at its portion facing the electric motor 13 upward in the vertical direction, wherein a bottom side of motor housing 15 is fixed to the open side of transmission mechanism housing part 47.

Figure 8:
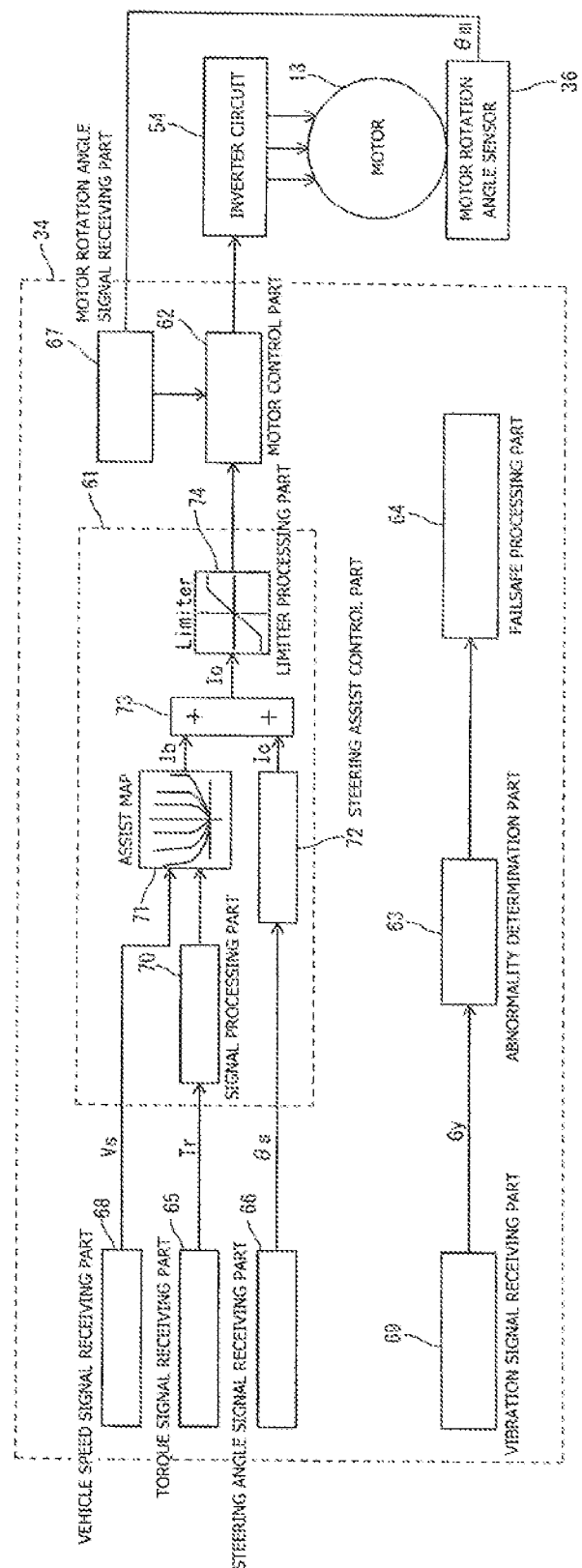
FIG. 8 is a control block diagram showing configuration of a calculating circuit of the control device according to the first embodiment.

The following describes specific circuit configuration of control device 14 according to the present embodiment with reference to FIGS. 7 and 8.

As shown in FIG. 7, control device 14 includes: a power supply circuit 51 serving as a power supply in control device 14; a processing device (microprocessor unit) 52 configured to be started up by power supply from power supply circuit 51, and perform various calculating operations; a pre-driver 53 configured as an integrated circuit (IC) to receive input of a command signal from processing device 52; and an inverter circuit 54 configured to be driven and controlled based on a command signal from pre-driver 53.

When power supply circuit 51 receives supply of electric power from battery VB in response to on-operation of an ignition switch IGN-SW of the vehicle, power supply circuit 51 supplies the electric power to processing device 52, pre-driver 53, torque sensing parts 9a, 9b of torque sensor 9, steering angle sensing parts 10a, 10b of steering angle sensor 10, motor rotation angle sensing parts 36a, 36b of motor rotation angle sensor 36, and acceleration sensor 37, while performing appropriate voltage reduction.

Processing device 52 is connected electrically to a vehicle speed sensor 55, and is configured to receive input of a vehicle speed signal Vs from vehicle speed sensor 55, wherein vehicle speed sensor 55 is provided at a differential gear not shown or the like. Processing device 52 is connected electrically also to acceleration sensor 37, and is configured to receive input of X-axis acceleration signal Gx, Y-axis acceleration signal Gy, and Z-axis acceleration signal Gz from acceleration sensor 37.

Processing device 52 is connected electrically also to torque sensing parts 9a, 9b, steering angle sensing parts 10a, 10b, and motor rotation angle sensing parts 36a, 36b, and is configured to receive input of main and auxiliary steering torque signals Tr(Main), Tr(Sub) from torque sensing parts 9a, 9b, main and auxiliary steering angle signals θs(Main), θs(Sub) from steering angle sensing parts 10a, 10b, main and auxiliary motor rotation angle signals θd(Main), θd(Sub) from motor rotation angle sensing parts 36a, 36b.

When receiving a command signal from pre-driver 53, the inverter circuit 54 converts the electric power of battery VB from direct current form to three-phase alternating current form and supplies the same to electric motor 13 in accordance with the command signal. A failsafe circuit 56 is disposed between battery VB and inverter circuit 54, and is configured to shut off the electric power sent from battery VB to inverter circuit 54, based on commanding of processing device 52, when a failure or the like occurs in the power steering device.

A motor current sensor 57 is disposed at a downstream side of inverter circuit 54, and is configured to sense an actual motor current Id that is an actual current flowing through the electric motor 13. The actual motor current Id sensed by motor current sensor 57 is inputted to a current monitoring circuit 58 provided in control device 14. Thereafter, actual motor current Id is applied with high-response filter processing by main and auxiliary current sensing circuits 59a, 59b for motor control in pairs, and is fed back to processing device 52, and is also applied with low-response filter processing by main and auxiliary current sensing circuits 59c, 59d for overcurrent sensing in pairs, and is fed back to processing device 52.

As shown in FIG. 8, control device 14 includes in acceleration sensor 37: a command signal calculation part 61 configured to calculate a motor command signal Io for control of driving of electric motor 13, based on information about steering and others; a motor drive control part 62 configured to output a command voltage to inverter circuit 54, based on motor command signal Io, etc., and thereby control driving of electric motor 13; an abnormality determination part 63 configured to determine whether or not the power steering device is abnormal; and a failsafe processing part 64 configured to perform various failsafe operations, based on a result of determination by abnormality determination part 63.

Microcomputer 34 includes: a torque signal receiving part 65 configured to receive input of torque signal Tr outputted by torque sensor 9; a steering angle signal receiving part 66 configured to receive input of steering angle signal θs outputted by steering angle sensor 10; a motor rotation angle signal receiving part 67 configured to receive input of motor rotation angle signal θd outputted by motor rotation angle sensor 36; and a vehicle speed signal receiving part 68 configured to receive input of vehicle speed signal Vs outputted by vehicle speed sensor 55; and a vibration signal receiving part 69 configured to receive input of the acceleration signal outputted by acceleration sensor 37.

Command signal calculation part 61 includes a signal processing part 70 configured to process the torque signal Tr by noise removal, phase compensation, etc., wherein torque signal Tr is acquired via torque signal receiving part 65 from torque sensor 9. Command signal calculation part 61 calculates a basic signal Ib by using a prepared assist map 71, based on vehicle speed signal Vs acquired via vehicle speed signal receiving part 68 from vehicle speed sensor 55, and the processed torque signal Tr. Command signal calculation part 61 further includes: a steering assist control part 72 configured to calculate a correction signal Ic based on steering angle signal θs acquired via steering angle signal receiving part 66 from steering angle sensor 10, in parallel with calculation of basic signal Ib; and an adder 73 configured to calculate motor command signal Io by adding the correction signal Ic to basic signal Ib.

Command signal calculation part 61 further includes a limiter processing part 74 configured to control an upper limit of motor command signal Io variably, and is configured to cause limiter processing part 74 to set the upper limit of motor command signal Io lower when electric motor 13 is overheated or so than when electric motor 13 is normal.

Motor drive control part 62 is configured to control driving of electric motor 13, based on motor command signal Io inputted from command signal calculation part 61 (limiter processing part 74) and motor rotation angle signal θd acquired via the motor rotation angle signal receiving part from motor rotation angle sensor 36.

Abnormality determination part 63 is configured to; acquire Y-axis acceleration signal Gy via vibration signal receiving part 69 from acceleration sensor 37; extract only a component of a frequency band of 200 Hz and higher of Y-axis acceleration signal Gy by high-pass filtering; and determine whether or not the power steering device is abnormal, based on whether or not the extracted component of the frequency band of 200 Hz and higher.

The determination of abnormality of the power steering device by abnormality determination part 63 is based on the extracted component of the frequency band of 200 Hz and higher, in consideration of a result of a first experiment and a result of a second experiment described below.

In the first experiment, a vibration occurring in housing 3 of the power steering device in its normal state (henceforth referred to as normal device) during steering operation of the normal device was compared with a vibration occurring in housing 3 of the power steering device in an abnormal state (henceforth referred to as abnormal device) during steering operation of the abnormal device, at each frequency.

Specifically, the first experiment was implemented by: performing a process for several days, the process including: mounting the power steering device on a flat experimental table; thereafter causing a predetermined quantity of salt water and sand of small particles to enter the interior of housing 3; performing steering operation of the steering wheel at a predetermined steering speed; and measuring by acceleration sensor 37 a vibration (changes in acceleration) of housing 3 caused by the steering operation; and checking a tendency of change of the vibration at each frequency.

Figure 9A:
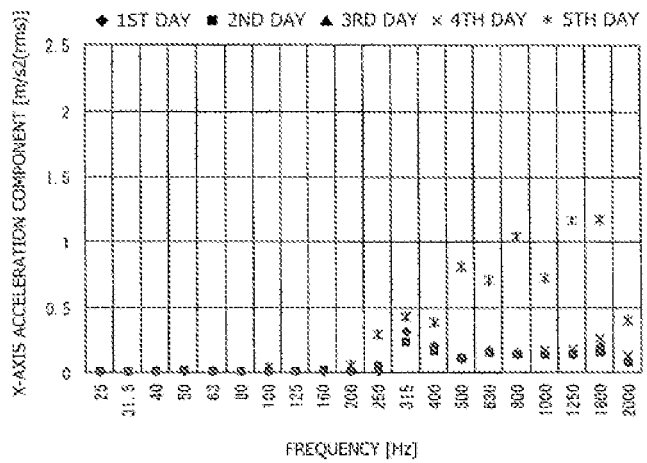
FIGS. 9A, 9B and 9C are graphs showing results of an experiment for measuring a vibration occurring in a housing during steering operation, where FIG. 9A plots an X-axis component of acceleration of the vibration for each frequency, FIG. 9B plots a Y-axis component of acceleration of the vibration for each frequency, and FIG. 9C plots a Z-axis component of acceleration of the vibration for each frequency.
Figure 9B:
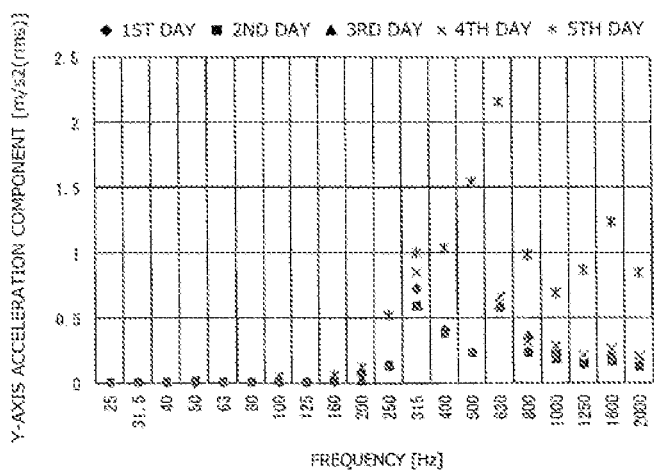
Figure 9C:
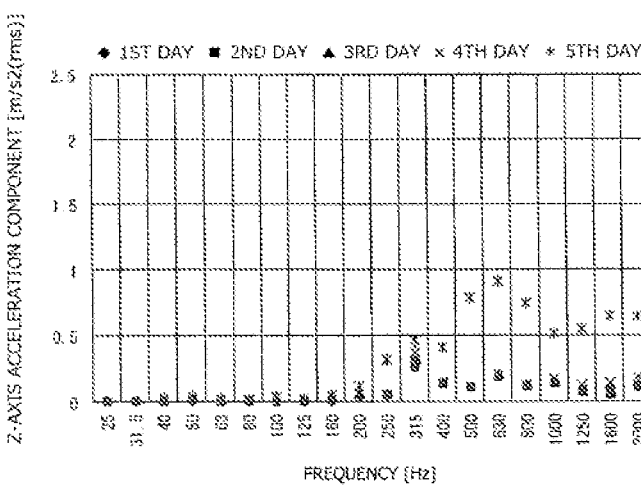

FIGS. 9A, 9B and 9C are graphs showing experimental results for the first to fifth days, where FIG. 9A plots X-axis component of acceleration of the vibration occurring in housing 3 for each frequency, FIG. 9B plots Y-axis component of acceleration of the vibration for each frequency, and FIG. 9C plots Z-axis component of acceleration of the vibration for each frequency.

FIGS. 9A, 9B and 9C clearly show that at the frequency band of 200 Hz and higher, the any axis component of the vibration (changes of acceleration) occurring in housing 3 due to steering operation of the steering wheel becomes larger, as an effect of sand trapped between ball circulation groove 43 and each ball 44 in ball screw mechanism 40 and an effect of rust occurring on surfaces of ball circulation groove 43 and balls 44 due to salt water become larger day by day. Namely, it was found that when the power steering device becomes abnormal, steering operation of the steering wheel causes a vibration due to the abnormal state of the power steering device itself (housing 3).

By paying attention to a variation in each acceleration component in the power steering device between the normal state and the abnormal state, it was found that the variation of the Y-axis acceleration component is the largest, and the variation of the X-axis acceleration component is the second largest, and the variation of the Z-axis acceleration component is the smallest.

The second experiment was implemented by: measuring a vibration inputted to housing 3 of the power steering device via the steered wheels from a road surface during actual driving, separately, during traveling on a paved road surface (smooth road), and during traveling on a graveled road surface (rough road); and retrieving a vibration level of each vibration at each frequency.

Figure 10:
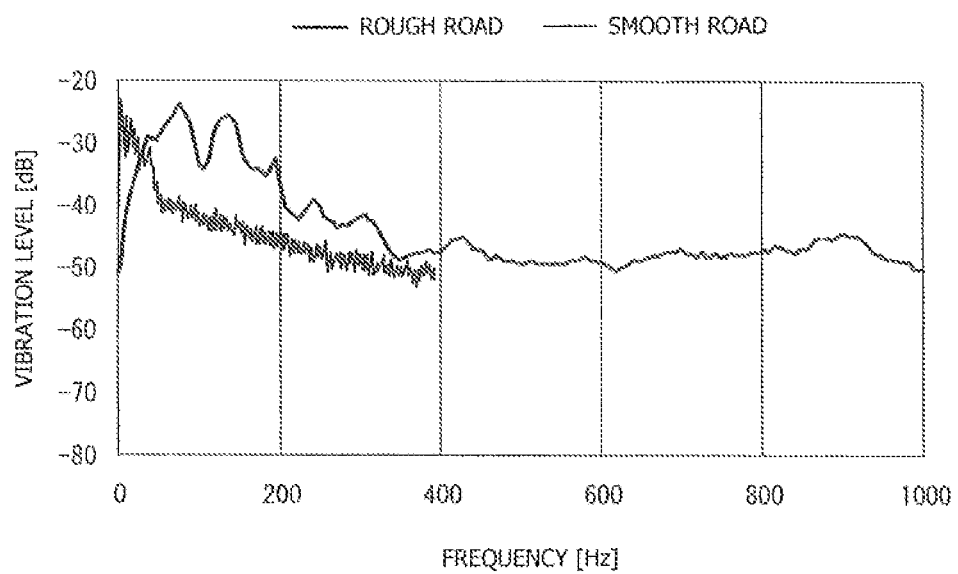
FIG. 10 is a graph plotting a vibration level of the vibration inputted from a road to the housing, when a vehicle where the power steering device according to the first embodiment is mounted is running on a smooth road in and on a rough road.

As shown in FIG. 10, it was found that the vibration inputted in housing 3 during traveling on the smooth road had a high vibration level only at a very low frequency band of 50 Hz and lower, where the vibration level was dampened significantly at a higher frequency band of 50 Hz and higher. It was also found that the vibration inputted in housing 3 during traveling on the rough road has a high vibration level at a low frequency band of 200 Hz and lower, where the vibration level was dampened significantly at a higher frequency band of 50 Hz and higher.

In view of the foregoing experimental results, abnormality determination part 63 is configured to perform abnormality determination, based on the component of the frequency band of 200 Hz and higher with which it is possible to recognize the normal device and the abnormal device from each other, and it is possible to ignore the effect of the vibration inputted from the road surface both for smooth road and for rough road, and based on Y-axis acceleration signal Gy as an acceleration signal used in abnormality determination, which shows a significant variation between the normal state and abnormal state of the power steering device.

When abnormality determination part 63 determines that the power steering device becomes abnormal, failsafe processing part 64 performs various failsafe operations such as an operation of warning a driver by turning on a warning light provided on an instrument panel not shown of the vehicle, and an operation of shutting off the steering assist control system.

Figure 11:
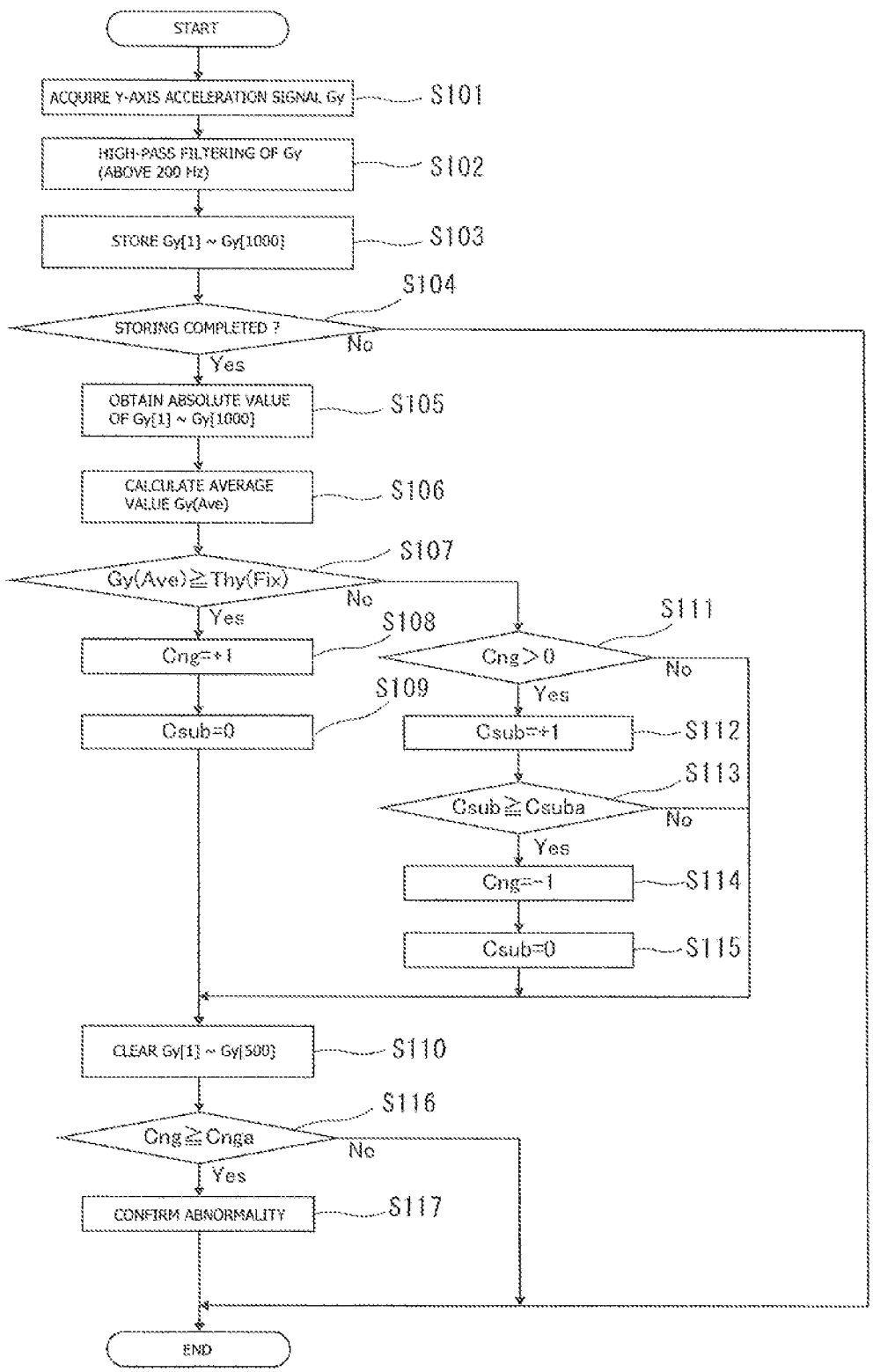
FIG. 11 is a flow chart showing a process of abnormality determination control of the power steering device according to the first embodiment.

The following describes specific configuration of abnormality determination processing control of abnormality determination part 63 of control device 14 for the power steering device with reference to the flow chart shown in FIG. 11.

First, abnormality determination part 63 acquires Y-axis acceleration signal Gy via vibration signal receiving part 69 from acceleration sensor 37 (Step S101), and extracts only the component of the frequency band of 200 Hz and higher of Y-axis acceleration signal Gy by high-pass filtering (Step S102), and thereafter stores the filtered Y-axis acceleration signal Gy for an arbitrary number of times (1000 times in the present embodiment) during a predetermined past time period (Step S103), and proceeds to Step S104 described below.

In the following description, time series of Y-axis acceleration signal Gy are represented by Y-axis acceleration signals Gy[1], Gy[2], Gy[3], . . . , Gy[999], Gy[1000] in the order from the oldest to the newest.

At Step S104, abnormality determination part 63 determines whether or not storing the 1000-times data of Y-axis acceleration signals Gy[1] to Gy[1000] is completed. In case of No at Step S104, abnormality determination part 63 terminates the present program without performing the abnormality determination for the power steering device. On the other hand, in case of Yes at Step S104, abnormality determination part 63 assumes that the abnormality determination is to be performed, and obtains an absolute value of each of Y-axis acceleration signals Gy[1] to Gy[1000] (Step S105), and based on the absolute values |Gy[1]| to |Gy[1000]|, calculates an average value Gy(Ave) of 1000-times Y-axis acceleration signals Gy (Step S106), and thereafter determines whether or not average value Gy(Ave) is greater than or equal to an abnormality determination threshold value Thy(Fix) that is a fixed value (Step S107).

In case of Yes at Step S107, abnormality determination part 63 assumes that it is likely that the power steering device is abnormal, and increments an NG-counter Cng (Step S108), and resets a subtraction counter Csub (Step S109). Subsequently, abnormality determination part 63 clears an old half of 1000-times Y-axis acceleration signals Gy[1] to Gy[1000] stored at Step S103, namely, clears Y-axis acceleration signals Gy[1] to Gy[500] (Step S110), and thereafter proceeds to Step S116 described below.

On the other hand, in case of No at Step S107, namely, when determining that average value Gy(Ave) is less than abnormality determination threshold value Thy(Fix), abnormality determination part 63 determines whether or not NG-counter Cng is greater than zero (Step S111). In case of No at Step S111, abnormality determination part 63 proceeds to Step S110. On the other hand, in case of Yes at Step S111, abnormality determination part 63 increments subtraction counter Csub (Step S112), and thereafter proceeds to Step S113. At Step S113, abnormality determination part 63 determines whether or not subtraction counter Csub is greater than a predetermined value Csuba. In case of No at Step S113, abnormality determination part 63 proceeds directly to Step S110. On the other hand, in case of Yes at Step S113, abnormality determination part 63 decrements NG-counter Cng (Step S114), and resets subtraction counter Csub (Step S115), and thereafter proceeds to Step S110.

At Step S116, abnormality determination part 63 determines whether or not NG-counter Cng is greater than or equal to a predetermined value Cnga. In case of No at Step S116, abnormality determination part 63 assumes that the power steering device does not become abnormal, and terminates the present program. On the other hand, in case of Yes at Step S116, abnormality determination part 63 confirms that the power steering device becomes abnormal (Step S117), and then terminates the present program.

<Operation and Effects of First Embodiment>

As is learned from the first experiment, when the power steering device is in an abnormal state where rainwater or sand dust enters the interior of housing 3 and thereby causes malfunctioning of ball screw mechanism 40 or the like, a vibration unique to the abnormal state occurs in the power steering device itself (housing 3) during steering operation of the steering wheel.

The feature of the present embodiment that control device 14 includes abnormality determination part 63 configured to determine whether or not the power steering device is abnormal, based on a vibration occurring in the power steering device, and abnormality determination part 63 is configured to determine that the power steering device is abnormal, in response to a condition where a vibration unique to the abnormal state is present, serves to allow to determine with high accuracy whether the power steering device is normal or abnormal.

In particular, the feature of the present embodiment that sensing of vibration of the power steering device (housing 3) is implemented by acceleration sensor 37, which is in general capable of sensing a vibration component with high accuracy, serves to allow control device 14 to detect abnormality of the power steering device with high accuracy.

The further feature of the present embodiment that acceleration sensor 37 is mounted on substrate 33 where microcomputer 34 is mounted and serves to determine abnormality of the power steering device, and acceleration sensor 37 is connected electrically to microcomputer 34 via the conductive pattern on substrate 33, serves to allow to shorten the path of transmission of an electrical signal between acceleration sensor 37 and microcomputer 34, as compared to a configuration where acceleration sensor 37 is attached directly to housing 3, and is connected electrically to microcomputer 34 via a harness or the like. This serves to reduce the effect of noise when a signal is transmitted, and thereby suppress the accuracy of the abnormality determination from being adversely affected by such noise. The unnecessity of connection via a harness or the like serves to reduce the number of components and thereby reduce the cost.

The feature that acceleration sensor 37 is mounted on substrate 33 may allow the vibration occurring in housing 3 to be dampened or amplified by substrate 33 made of resin which is likely to be deformed, and thereby prevent the acceleration sensor 37 from correctly sensing the vibration.

In view of the foregoing, according to the present embodiment, acceleration sensor 37 is located adjacent to fixing hole 33a for fixing the substrate 33 to housing 3 (case member 24 of control housing 22). This serves to suppress substrate 33 from dampening or amplifying the vibration, and thereby allow to obtain sensing values nearly equal to sensing values that can be obtained in the configuration where acceleration sensor 37 is mounted directly to housing 3, and thereby suppress the accuracy of sensing of the vibration by acceleration sensor 37 from being adversely affected, and thereby suppress the accuracy of the abnormality determination for the power steering device from being adversely affected.

The feature of the present embodiment that the abnormality determination of abnormality determination part 63 for the power steering device is based on Y-axis acceleration signal Gy among X-axis, Y-axis and Z-axis acceleration signals Gx, Gy and Gz, where Y-axis acceleration signal Gy shows a significant variation between normal state and abnormal state of the power steering device, serves to perform abnormality determination with higher accuracy than when X-axis acceleration signal Gx or Z-axis acceleration signal Gz is used for abnormality determination instead of Y-axis acceleration signal Gy.

The further feature of the present embodiment that abnormality determination part 63 is configured to extract the component of the frequency band of 200 Hz and higher of Y-axis acceleration signal Gy that shows a significant variation between normal state and abnormal state of the power steering device, and determine abnormality of the power steering device based on the extracted component of Y-axis acceleration signal Gy, serves to enhance the accuracy of the abnormality determination.

The feature of the present embodiment that the frequency band used for abnormality determination for the power steering device is limited to the frequency band of 200 Hz and higher, serves to minimize the effect of a vibration inputted to housing 3 via the steered wheels from the road surface, This serves to reduce a risk that abnormality determination part 63 incorrectly determines that the power steering device is abnormal, based on the vibration inputted from the road surface, and thereby further enhance the accuracy of the abnormality determination.

The further feature of the present embodiment that acceleration sensor 37 is implemented by an AC acceleration sensor configured to sense only a dynamic acceleration without sensing a static acceleration, serves to further enhance the accuracy of the abnormality determination, because no static acceleration is included in the acceleration component obtained by acceleration sensor 37, and no static acceleration affects the abnormality determination for the power steering device, wherein such a static acceleration is not required for sensing of vibration of the power steering device.

If the abnormality determination for the power steering device is based on a single vibration signal, noise or the like may cause incorrect abnormality determination. However, the feature of the present embodiment that the abnormality determination for the power steering device is based on average value Gy(Ave) of Y-axis acceleration signals Gy during the predetermined time period, serves to suppress the effect of noise, and thereby enhance the accuracy of the abnormality determination.

In particular, the feature of the present embodiment that among Y-axis acceleration signals Gy[1] to Gy[1000] used for calculation of average value Gy(Ave), values Gy[1] to Gy[999] except for Gy[1000] are already obtained from Y-axis acceleration signals Gy obtained during the past predetermined time periods, serves to effectively reduce the load of calculation of microcomputer 34 for the abnormality determination, as compared to a control device configured to obtain Y-axis acceleration signals Gy at every execution of the abnormality determination control routine.

Second Embodiment

Figure 12:
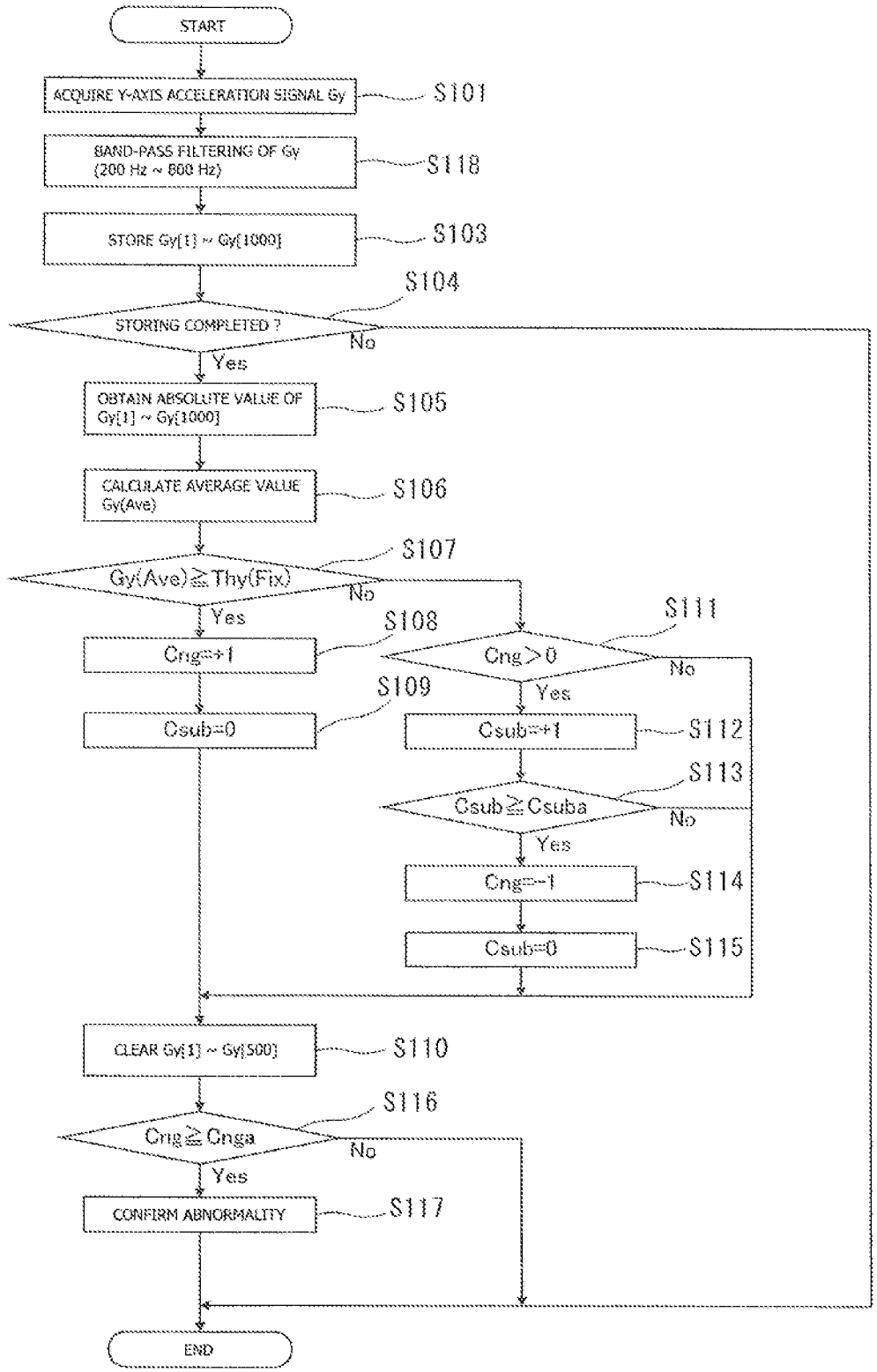
FIG. 12 is a flow chart showing a process of abnormality determination control of a power steering device according to a second embodiment of the present invention.

FIG. 12 shows a second embodiment of the present invention in which the abnormality determination control processing for the power steering device is modified about the operation of filtering the Y-axis acceleration signal Gy. The same configuration and operations of the second embodiment are allocated with the same symbols as in the first embodiment, and specific description thereof is omitted (the following embodiments are treated similarly).

Referring to FIG. 9B and others showing the result of the first experiment, it is found that a component of a frequency band from 400 Hz to 800 Hz shows a significant variation between normal state and abnormal state of the power steering device.

In view of the foregoing, the present embodiment is configured such that abnormality determination part 63 is configured to extract the component of the frequency band from 400 Hz to 800 Hz of Y-axis acceleration signal Gy.

Accordingly, the flow of abnormality determination control for the power steering device according to the present embodiment is modified as shown in FIG. 12 such that the high-pass filtering (Step S102) in the flow of the first embodiment is replaced with band-pass filtering (Step S118) for extracting a component of the frequency band from 400 Hz to 800 Hz of Y-axis acceleration signal Gy.

The configuration of control device 14 according to the present embodiment described above serves to produce similar effects as in the first embodiment, and the feature of extracting only the component of the frequency band from 400 Hz to 800 Hz of Y-axis acceleration signal Gy that shows a significant variation between normal state and abnormal state of the power steering device, and determining the abnormality of the power steering device based on the extracted component of the vibration, serves to further enhance the accuracy of the abnormality determination.

Third Embodiment

Figure 13:
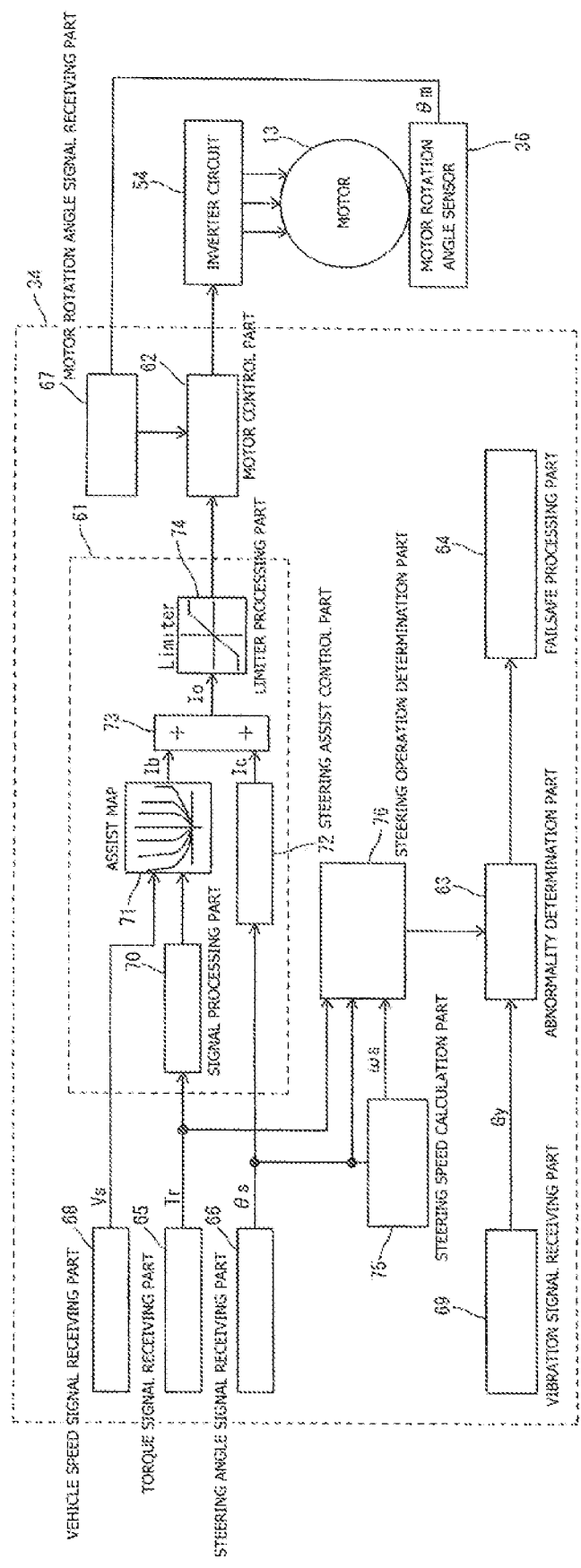
FIG. 13 is a block diagram showing configuration of an electrical system of a control device according to a third embodiment of the present invention.
Figure 14:
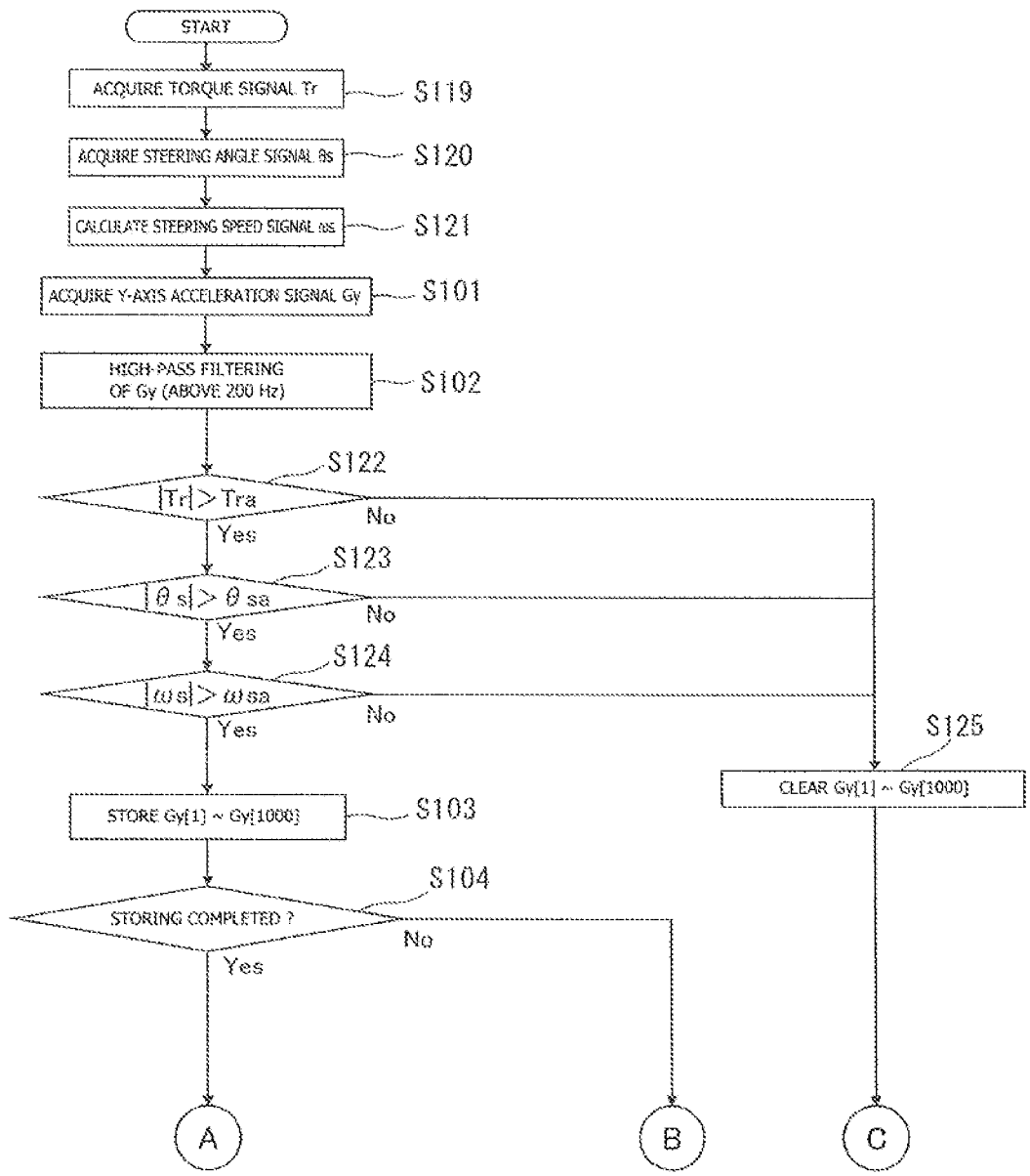
FIG. 14 is a flow chart showing an upstream part of a process of abnormality determination control of a power steering device according to the third embodiment.
Figure 15:
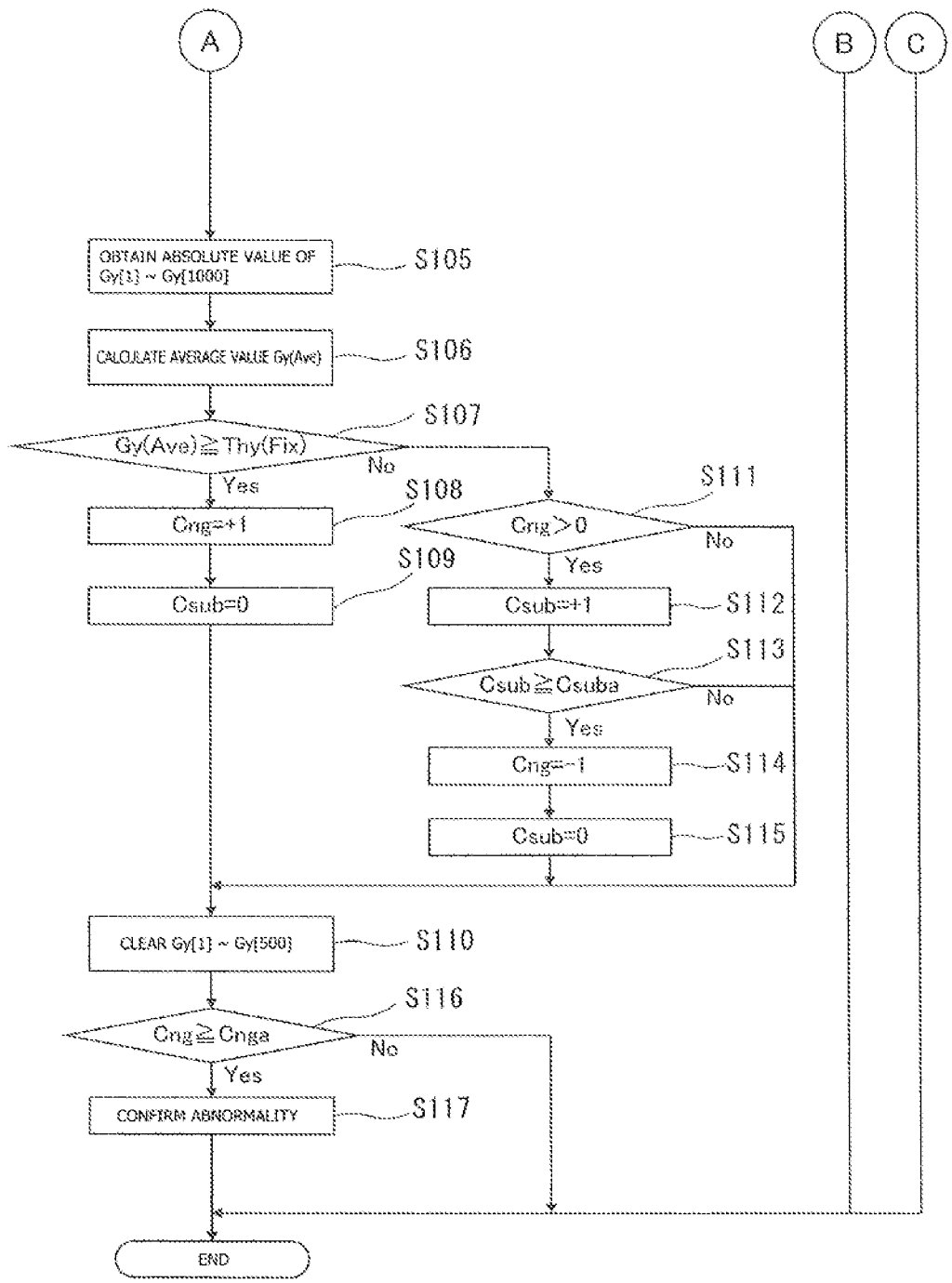
FIG. 15 is a flow chart showing a downstream part of the process of abnormality determination control of the power steering device according to the third embodiment.

FIGS. 13 to 15 show a third embodiment of the present invention in which presence/absence of driver's steering operation of the steering wheel is checked during the abnormality determination control processing for the power steering device.

Specifically, as shown in FIG. 13, microcomputer 34 of control device 14 according to the third embodiment further includes a steering speed calculation part 75 and a steering operation determination part 76 in addition to the configuration of the first embodiment, wherein steering speed calculation part 75 is configured to calculate a steering speed by time-differentiating the steering angle signal θs, and wherein steering operation determination part 76 is configured to determine whether or not steering operation of the steering wheel is present, based on torque signal Tr, steering angle signal θs, and a steering speed signal ωs that is a signal of steering speed outputted by steering speed calculation part 75.

Steering operation determination part 76 determines that steering operation is present, in response to a condition that each of steering speed signal ωs, steering torque signal Tr, and steering angle signal θs is greater than a corresponding predetermined value, and outputs a signal indicative of presence of steering operation to abnormality determination part 63.

Abnormality determination part 63 according to the present embodiment is configured to perform the abnormality determination for the power steering device, only when the signal described above is being outputted by steering operation determination part 76, namely, only when steering operation determination part 76 determines that steering operation of the steering wheel is present.

FIGS. 14 and 15 show a flow chart showing a process of abnormality determination control by control device 14 for the power steering device according to the present embodiment.

Specifically, Steps S119, S120 and S121 are added prior to the operation of Step S101, wherein Step S119 is configured to acquire torque signal Tr outputted by torque sensor 9, and Step S120 is configured to acquire steering angle signal θs outputted by steering angle sensor 10, and Step S121 is configured to cause steering speed calculation part 75 to calculate steering speed signal ωs from the acquired steering angle signal θs.

Furthermore, Steps S122, S123 and S124 are added after the operation of Step S102, wherein Step S122 is configured to determine whether or not torque signal Tr has an absolute value greater than a predetermined value Tra, and Step S123 is configured to determine whether or not steering angle signal θs has an absolute value greater than a predetermined value θsa, and Step S124 is configured to determine whether or not steering speed signal ωs has an absolute value greater than a predetermined value ωsa.

In case of Yes at every one of Steps S122 to S124, it is determined that steering operation is present, and the process proceeds to Step S103, and thereafter abnormality determination part 63 starts to perform the abnormality determination for the power steering device.

On the other hand, in case of No at any one of Steps S122 to S124, it assumes that steering operation is absent, and clears 1000-times Y-axis acceleration signals Gy[1] to Gy[1000] (Step S125) without performing the abnormality determination for the power steering device, and terminates the present program.

The vibration unique to the abnormal state occurs in the power steering device when the steering wheel is being steered, not when the vehicle is traveling straight with no steering operation of the steering wheel. This requires that the abnormality determination is performed only when the steering wheel is being steered, for correct abnormality determination for the power steering device.

In view of the foregoing, abnormality determination part 63 according to the present embodiment is configured to determine abnormality of the power steering device, based on Y-axis acceleration signal Gy when steering operation determination part 76 determines that the steering wheel is being steered. This serves to allow the abnormality determination to be performed properly.

The feature of the present embodiment that the abnormality determination processing control by abnormality determination part 63 for the power steering device is performed only when steering operation determination part 76 determines that the steering wheel is being steered, serves to omit unnecessary calculations while the vehicle is traveling straight or the like, and thereby reduce the load of calculation of microcomputer 34.

In general, it is desirable that the vibration level of the vibration occurring in the power steering device is somewhat high, for determination whether the power steering device is in normal state or abnormal state.

As described in detail below with reference to a fourth embodiment, an experiment reveals that as the steering speed increases, the vibration level of the vibration occurring in the power steering device due to steering operation of the steering wheel increases.

In view of the foregoing, in the present embodiment, steering operation determination part 76 is configured to determine whether or not steering operation is present, based on whether or not steering speed signal ωs is greater than the predetermined value, as one of the criteria.

This serves to enhance the accuracy of the abnormality determination, because when steering operation determination part 76 determines that steering operations is present, the vibration level of the vibration occurring in the power steering device becomes suitable for the abnormality determination for the power steering device.

Fourth Embodiment

Figure 16:
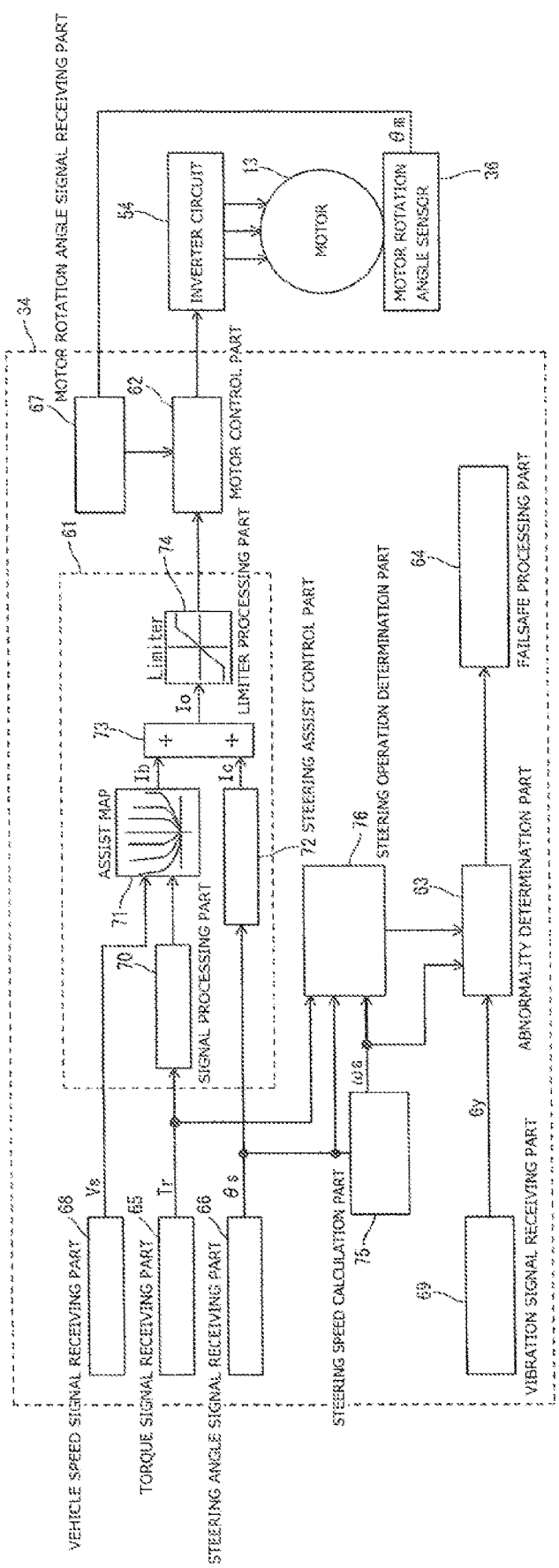
FIG. 16 is a block diagram showing configuration of an electrical system of a control device according to a fourth embodiment of the present invention.
Figure 17:
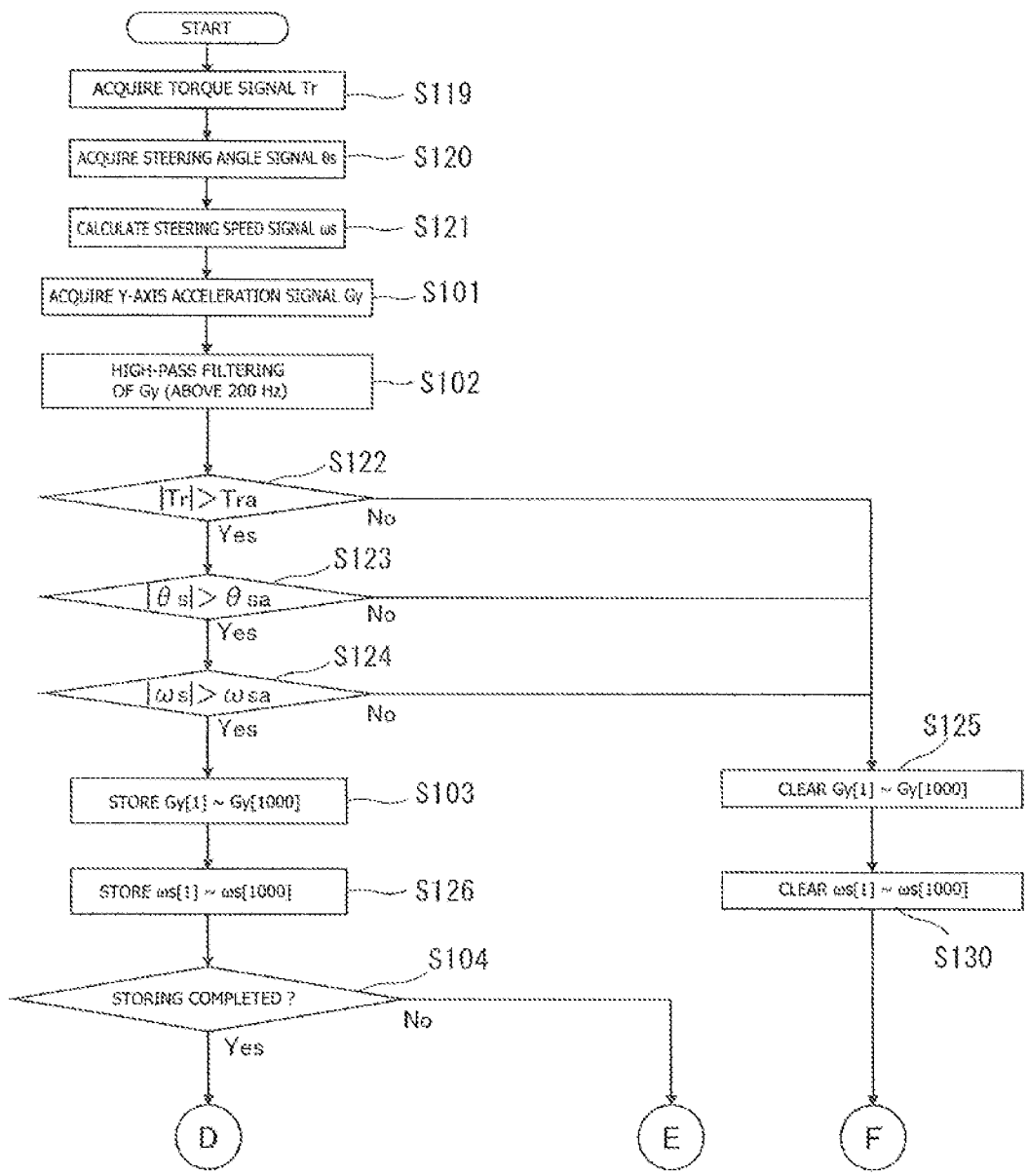
FIG. 17 is a flow chart showing an upstream part of a process of abnormality determination control of a power steering device according to the fourth embodiment.
Figure 18:
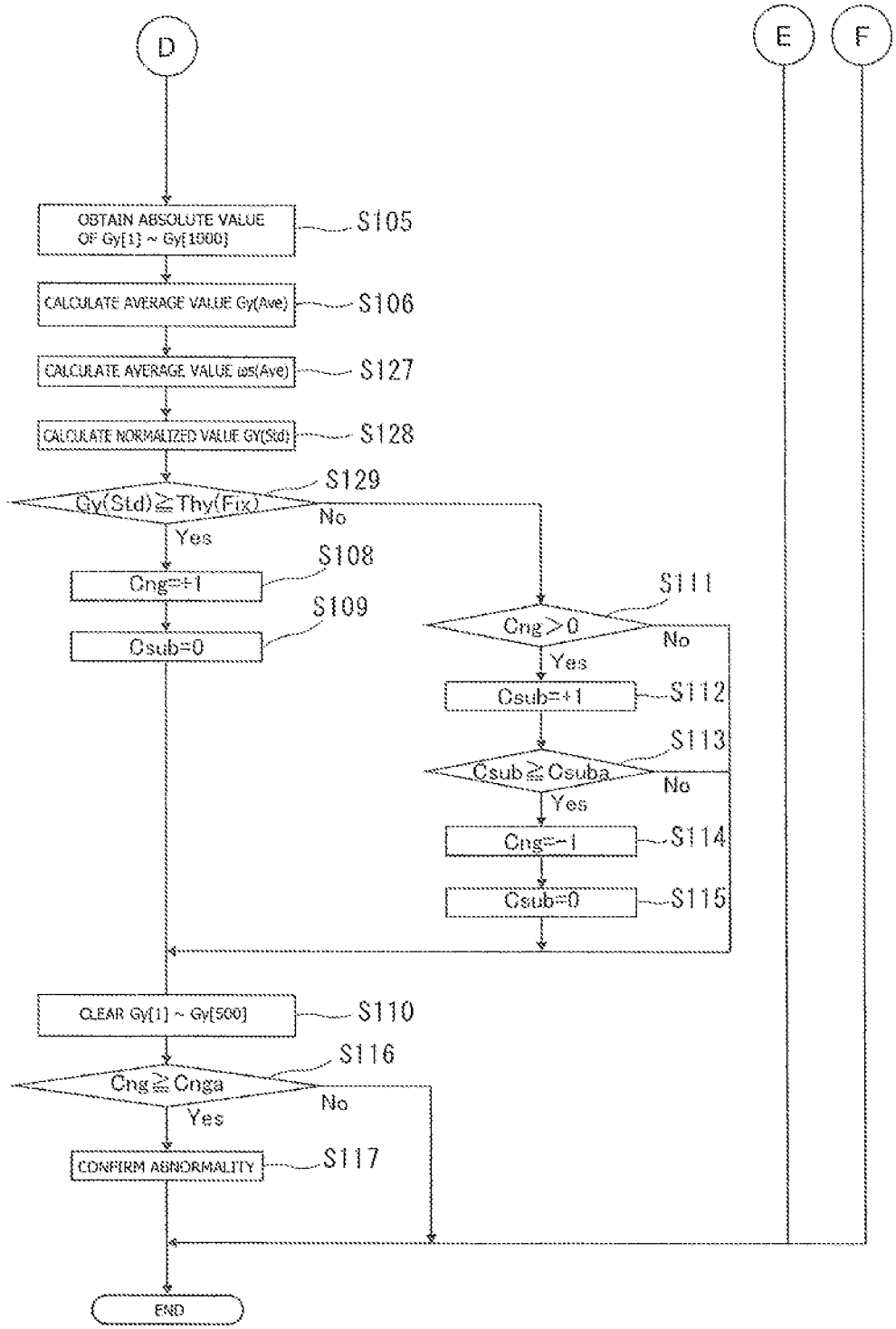
FIG. 18 is a flow chart showing a downstream part of the process of abnormality determination control of the power steering device according to the fourth embodiment.

FIGS. 16 to 18 show a fourth embodiment of the present invention in which the magnitude of steering speed is checked in addition to the check of presence/absence of driver's steering operation of the steering wheel during the abnormality determination control processing for the power steering device, in consideration of a result of a third experiment described below.

Figure 19A:
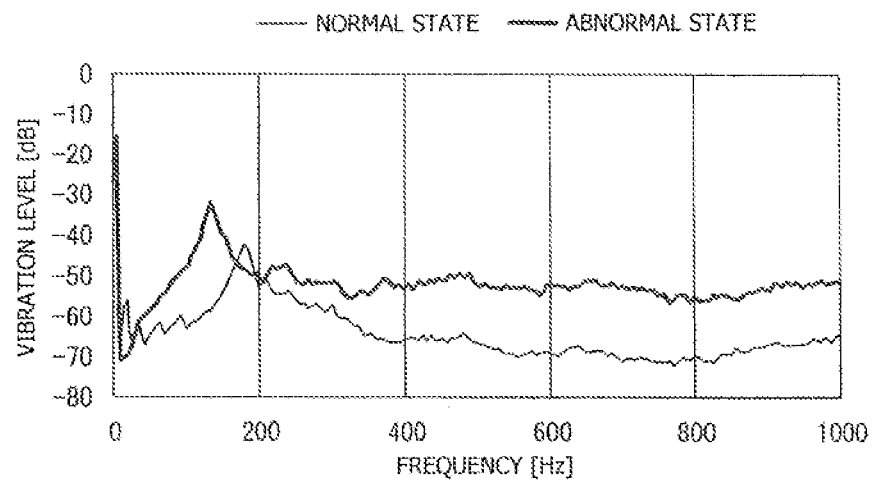
FIGS. 19A and 19B are graphs showing the vibration level of the vibration occurring in the housing during steering operation, where
Figure 19B:
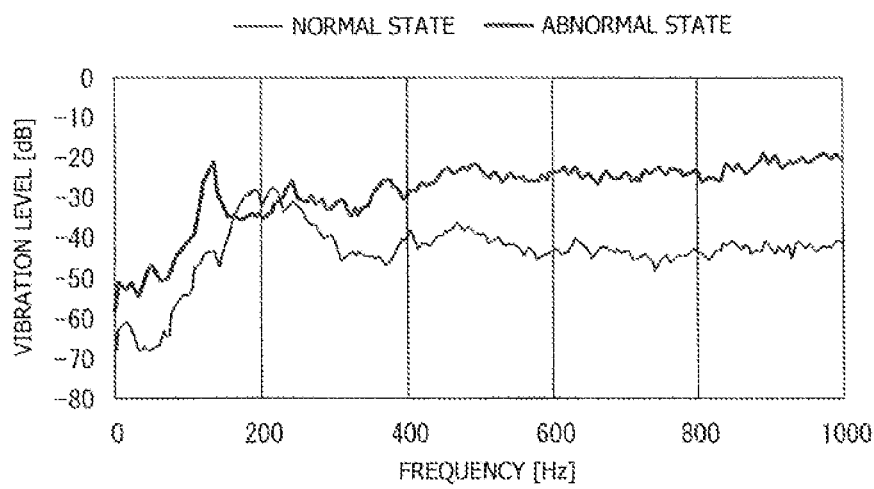

The third experiment was implemented by placing each of the normal device and the abnormal device on the experimental table, and measuring the vibration level for the case of steering operation at steering speed of 90 degrees per second (see FIG. 19A), and for the case of steering operation at steering speed of 360 degrees per second (see FIG. 19B).

As is clear from the figures, it was found that the vibration level is increased by increase of steering speed both in the normal device and in the abnormal device.

It was also found that the vibration level for the case of steering operation at steering speed of 360 degrees per second is higher that the vibration level for the case of steering operation at steering speed of 90 degrees per second. This means that even when the power steering device is in normal state, steering operation at fast steering speed may cause incorrect determination due to a vibration caused by the steering operation.

In view of the experimental result described above, as shown in FIG. 16, control device 14 according to the present embodiment is basically configured as in the third embodiment, but is modified such that abnormality determination part 63 acquires steering speed signal ωs from steering speed calculation part 75 during the abnormality determination for the power steering device.

Abnormality determination part 63 is configured to correct the Y-axis acceleration signal Gy, which is acquired from acceleration sensor 37, based on steering speed signal ωs, and determine abnormality of the power steering device based on comparison between the corrected signal and an abnormality determination threshold value.

Specifically, abnormality determination part 63 is configured to calculate a normalized value GY(Std) by dividing the Y-axis acceleration signal Gy by steering speed signal ωs to obtain a quantity and then multiplying the quantity by a predetermined factor A. The normalized value GY(Std), which is normalized by division of steering speed signal ωs, is free from the effect of steering speed. Abnormality determination part 63 is configured to determine abnormality of the power steering device, based on whether or not normalized value GY(Std) is greater than or equal to abnormality determination threshold value Thy(Fix).

FIGS. 17 and 18 show a flow chart showing a process of abnormality determination control for the power steering device according to the present embodiment.

In the flow of the present embodiment, after the operation of Step S103 of the flow chart of the third embodiment, Step S126 is added to store 1000-times steering speed signals ωs[1] to ωs[1000]. The steering speed signals ωs[1], ωs[2], ..., ωs[1000] are acquired simultaneously with acquiring of Y-axis acceleration signals Gy[1], Gy[2], ..., Gy[1000].

Furthermore, after the operation of Step S106 for calculating the average value Gy(Ave), Steps S127 and S128 are added, wherein Step S127 is configured to calculate an average value ωs(Ave) of 1000-times steering speed signals ωs, based on absolute values |ωs[1]| to |ωs[1000]| of steering speed signals ωs[1] to ωs[1000], and Step S128 is configured to calculate a normalized value a GY(Std) (=[factor A]·[average value Gy(Ave) of Y-axis acceleration signal Gy]/[average value ωs(Ave) of steering speed signal ωs]), based on average value Gy(Ave) of Y-axis acceleration signal Gy and average value ωs(Ave) of steering speed signal ωs.

Moreover, Step S107 is replaced with Step S129 configured to determine whether or not normalized value GY(Std) is greater than or equal to abnormality determination threshold value Thy(Fix). In case of Yes at Step S129, the process proceeds to Step S108. In case of No, the process proceeds to Step S111.

The operation of Step S125, which is executed in case of No at any one of Steps S122 to S124, is followed by Step S130 added to clear 1000-times steering speed signals ωs[1] to ωs[1000].

The feature of the present embodiment that during the abnormality determination by abnormality determination part 63 for the power steering device, Y-axis acceleration signal. Gy is normalized to cancel the effect of steering speed, and abnormality of the power steering device is determined based on the normalized Y-axis acceleration signal Gy(Std), serves to reduce the risk of incorrect determination that the power steering device becomes abnormal under influence of fast steering speed, and thereby enhance the accuracy of the abnormality determination.

Fifth Embodiment

Figure 20:
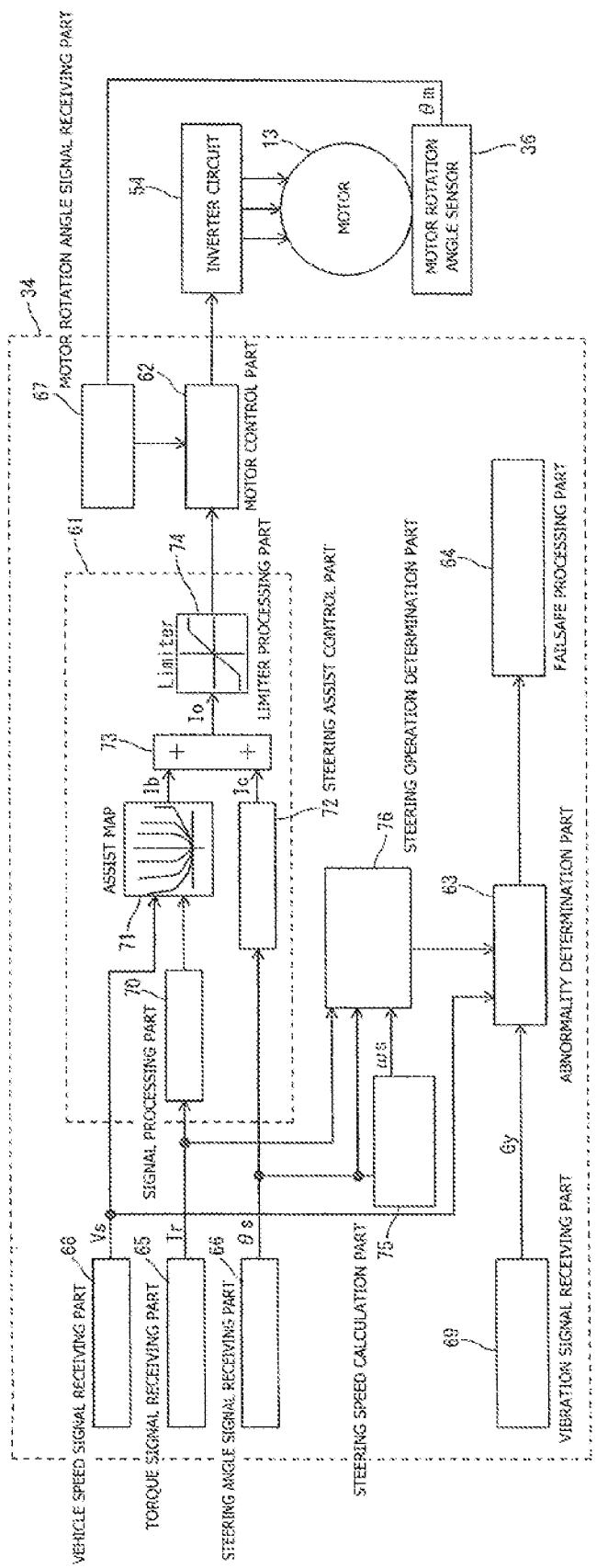
FIG. 20 is a block diagram showing configuration of an electrical system of a control device according to a fifth embodiment of the present invention.
Figure 21:
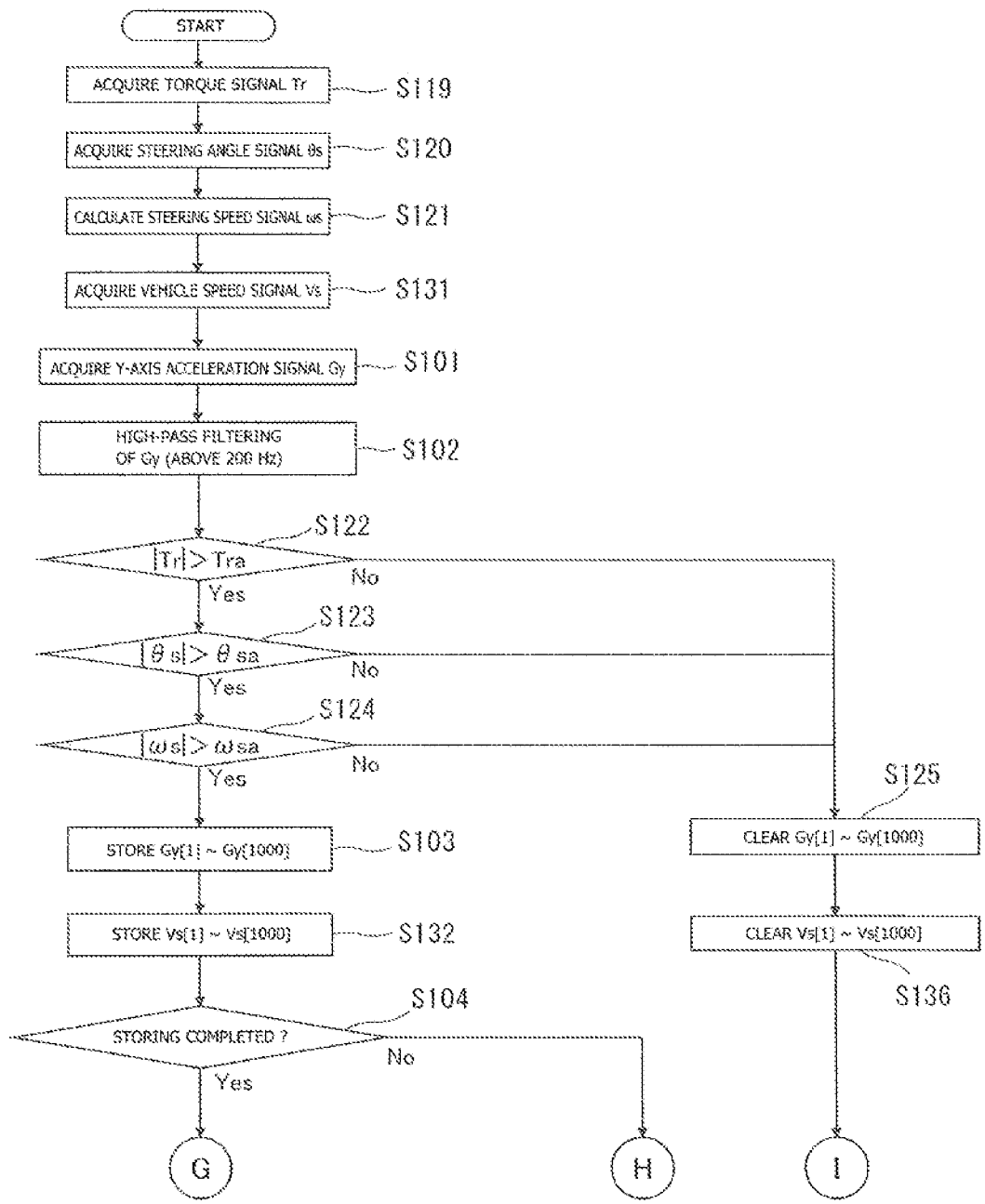
FIG. 21 is a flow chart showing an upstream part of a process of abnormality determination control of a power steering device according to the fifth embodiment.
Figure 22:
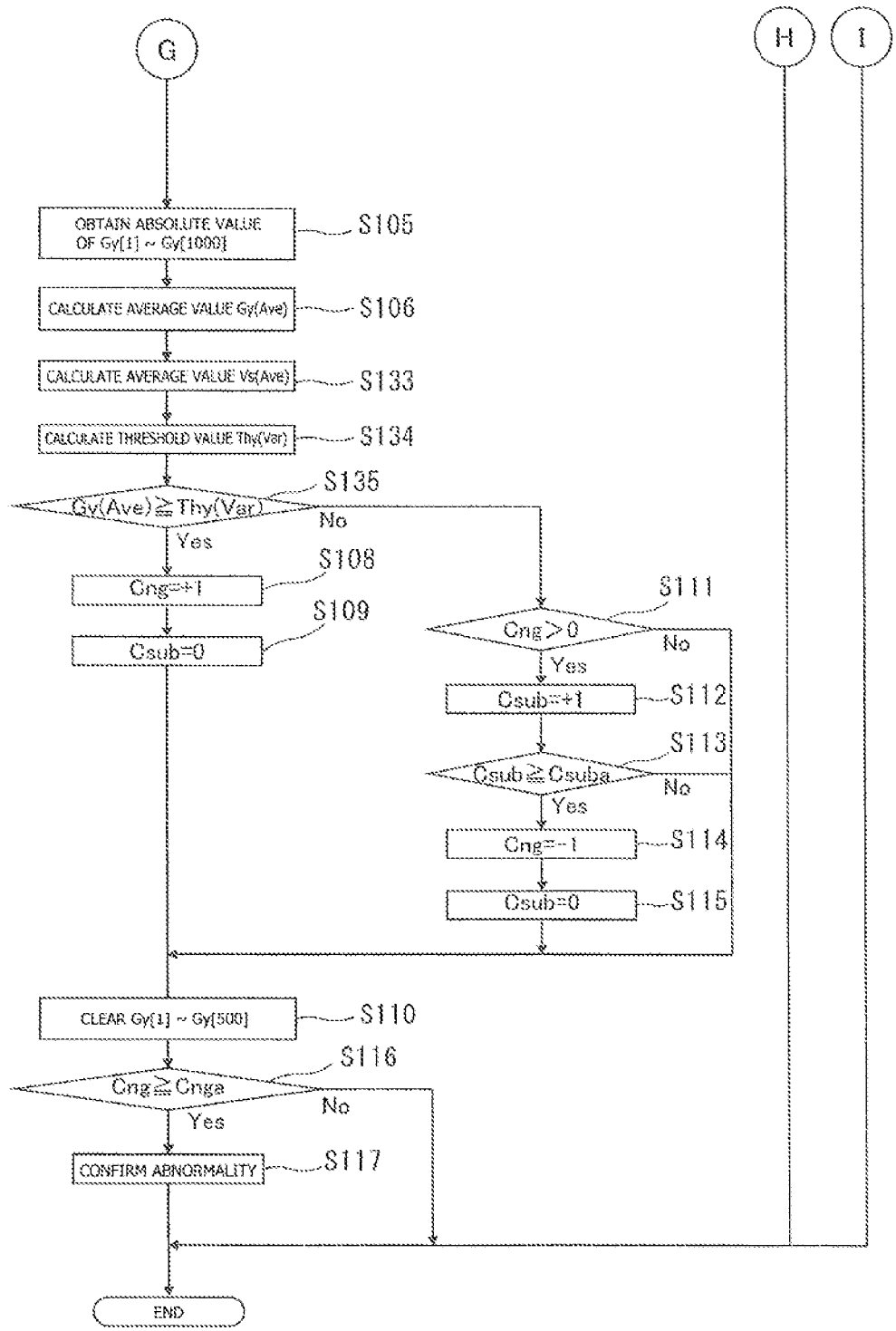
FIG. 22 is a flow chart showing a downstream part of the process of abnormality determination control of the power steering device according to the fifth embodiment.

FIGS. 20 to 22 show a fifth embodiment of the present invention in which abnormality determination threshold value Thy(Fix) that is a fixed value used for the abnormality determination processing control of the third embodiment is replaced with a variable value that is controlled variably depending on vehicle speed.

Specifically, as shown in FIG. 20, abnormality determination part 63 according to the present embodiment is configured to acquire vehicle speed signal Vs via vehicle speed signal receiving part 68, and control an abnormality determination threshold value Thy(Var) variably depending on vehicle speed signal Vs.

FIGS. 21 and 22 show a flow chart showing a process of abnormality determination control for the power steering device according to the present embodiment.

Specifically, in the flow of the present embodiment, after the operation of Step S121 in the flow of the third embodiment, Step S131 is added to acquire vehicle speed signal Vs via vehicle speed signal receiving part 68, and after the operation of Step S103, Step S132 is added to store 1000-times vehicle speed signals Vs[1] to Vs[1000]. The vehicle speed signals Vs[1], Vs[2], . . . , Vs[1000] are acquired simultaneously with acquiring of Y-axis acceleration signals Gy[1], Gy[2], . . . , Gy[1000].

Furthermore, after the operation of Step S106 for calculating the average value Gy(Ave), Steps S133 and S134 are added, wherein Step S133 is configured to calculate an average value Vs(Ave) of 1000-times vehicle speed signals Vs, based on vehicle speed signals Vs[1] to Vs[1000], and Step S134 is configured to calculate abnormality determination threshold value Thy(Var) based on average value Vs(Ave) of vehicle speed signal Vs calculated at Step S133. Abnormality determination threshold value Thy(Var) calculated at Step S134 is controlled variably to increase as average value Vs(Ave) of vehicle speed signal Vs increases.

Moreover, Step S107 is replaced with Step S135 configured to determine whether or not average value Gy(Ave) is greater than or equal to abnormality determination threshold value Thy(Var). In case of Yes at Step S135, the process proceeds to Step S108. In case of No, the process proceeds to Step S111.

The operation of Step S125, which is executed in case of No at any one of Steps S122 to S124, is followed by Step S136 added to clear 1000-times steering speed signals Vs[1] to Vs[1000].

Normally, the vibration occurring in the power steering device during steering operation is amplified as the vehicle speed increases, regardless of whether the power steering device is normal or abnormal.

Accordingly, the configuration that abnormality determination threshold value Thy used for the abnormality determination for the power steering device is set to a fixed value, may cause incorrect determination of presence of abnormality based on the vibration amplified by high-speed running.

In contrast, the feature of the present embodiment that abnormality determination threshold value Thy is implemented by abnormality determination threshold value Thy (Var) that is controlled variably to increase as the vehicle speed (average value of vehicle speed signal Vs) increases, serves to effectively suppress the occurrence of incorrect determination, and thereby further enhance the accuracy of the abnormality determination.

Sixth Embodiment

Figure 23:
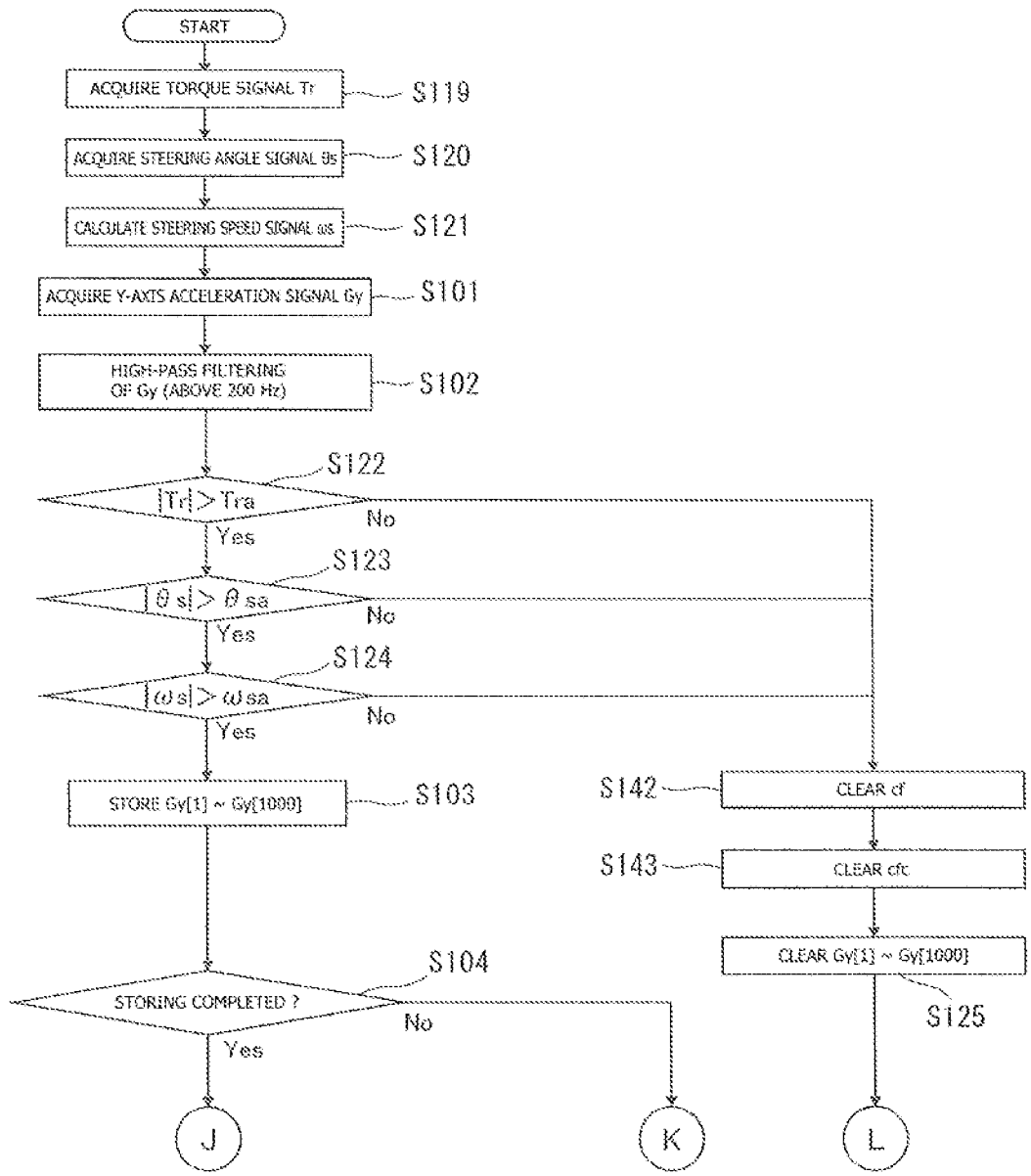
FIG. 23 is a flow chart showing an upstream part of a process of abnormality determination control of a power steering device according to a sixth embodiment.
Figure 24:
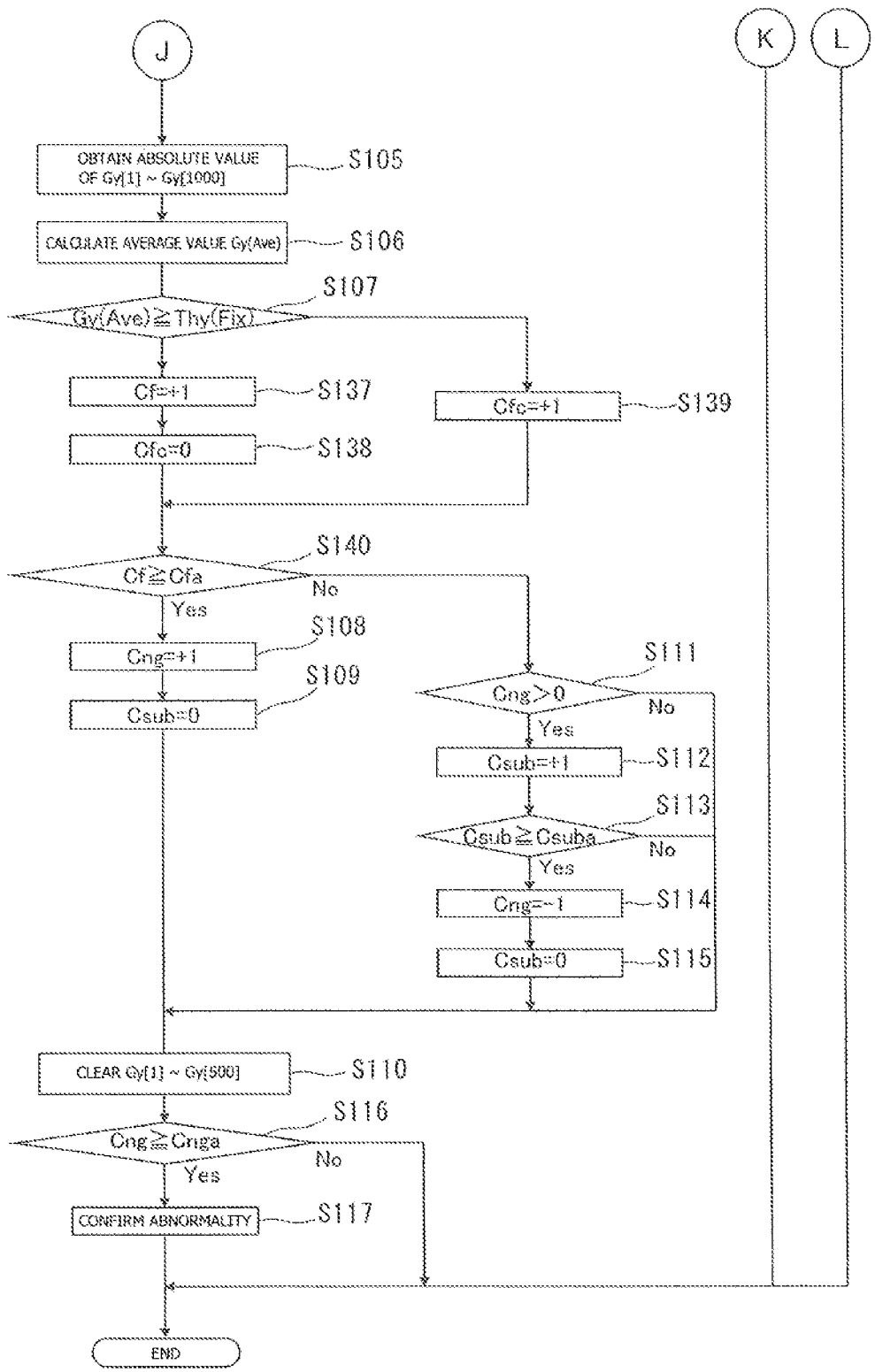
FIG. 24 is a flow chart showing a downstream part of the process of abnormality determination control of the power steering device according to the sixth embodiment.

FIGS. 23 and 24 show a flow chart showing a process of abnormality determination control for the power steering device according to the sixth embodiment, where the abnormality determination by abnormality determination part 63 for the power steering device is based on the frequency with which Y-axis acceleration signal Gy exceeds a predetermined value.

Specifically, in the flow of the present embodiment, in case of Yes at Step S107, abnormality determination part 63 increments a frequency counter Cf (Step S137), and clears a frequency clearing counter Cfc (Step S138), and thereafter proceeds to Step S140 described below. On the other hand, in case of No at Step 5107, abnormality determination part 63 increments frequency clearing counter Cfc (Step S139), and thereafter proceeds to Step S140.

At Step S140, abnormality determination part 63 determines whether or not frequency counter Cf is greater than or equal to a predetermined value Cfa. In case of Yes at Step S140, abnormality determination part 63 proceeds to Step S108. On the other hand, in case of No at Step S140, abnormality determination part 63 proceeds to Step S111.

In the present embodiment, in case of Yes at Step S111, abnormality determination part 63 determines whether or not frequency clearing counter Cfc is greater than or equal to a predetermined value Cfca (Step S141). In case of Yes at Step S141, abnormality determination part 63 proceeds to Step S112. On the other hand, in case of No at Step S141, abnormality determination part 63 proceeds to Step S110.

Furthermore, in case of No at any one of Steps S122 to S124, abnormality determination part 63 clears frequency counter Cf (Step S142), and clears frequency clearing counter Cfc (Step S143), and thereafter proceeds to Step S125.

As discussed above with reference to the first embodiment, if the abnormality determination for the power steering device is based on a single vibration signal, noise or the like may cause incorrect abnormality determination.

However, the feature of the present embodiment that the abnormality determination for the power steering device is based on the frequency with which Y-axis acceleration signal Gy exceeds abnormality determination threshold value Thy(Fix), serves to suppress the effect of noise, and thereby enhance the accuracy of the abnormality determination.

In particular, the feature of the present embodiment that determination of the frequency is based on average value Gy of Y-axis acceleration signal Gy, serves to suppress the effect of noise by averaging, and thereby further improve the control of abnormality determination.

Seventh Embodiment

Figure 25:
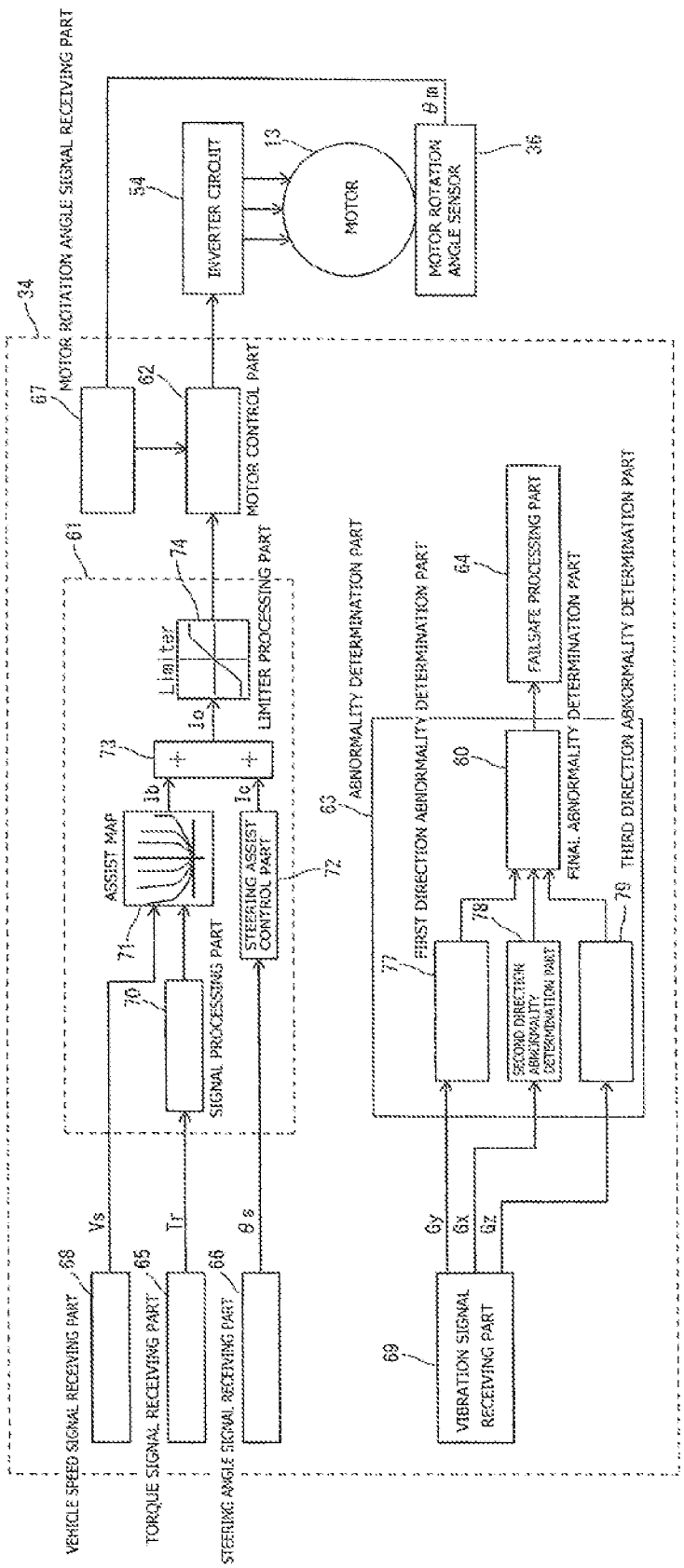
FIG. 25 is a block diagram showing configuration of an electrical system of a control device according to a seventh embodiment of the present invention.
Figure 26:
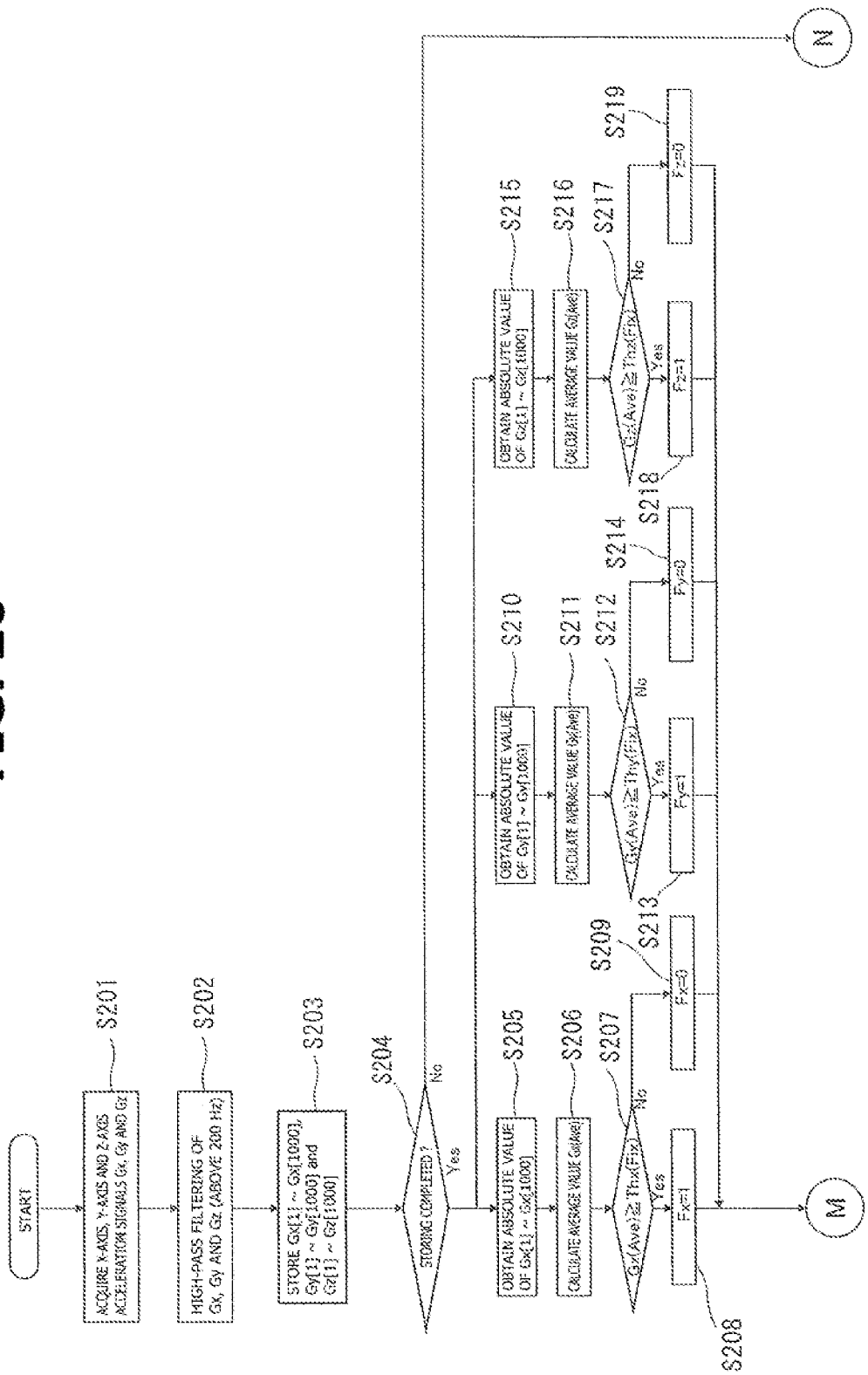
FIG. 26 is a flow chart showing an upstream part of a process of abnormality determination control of a power steering device according to the seventh embodiment.
Figure 27:
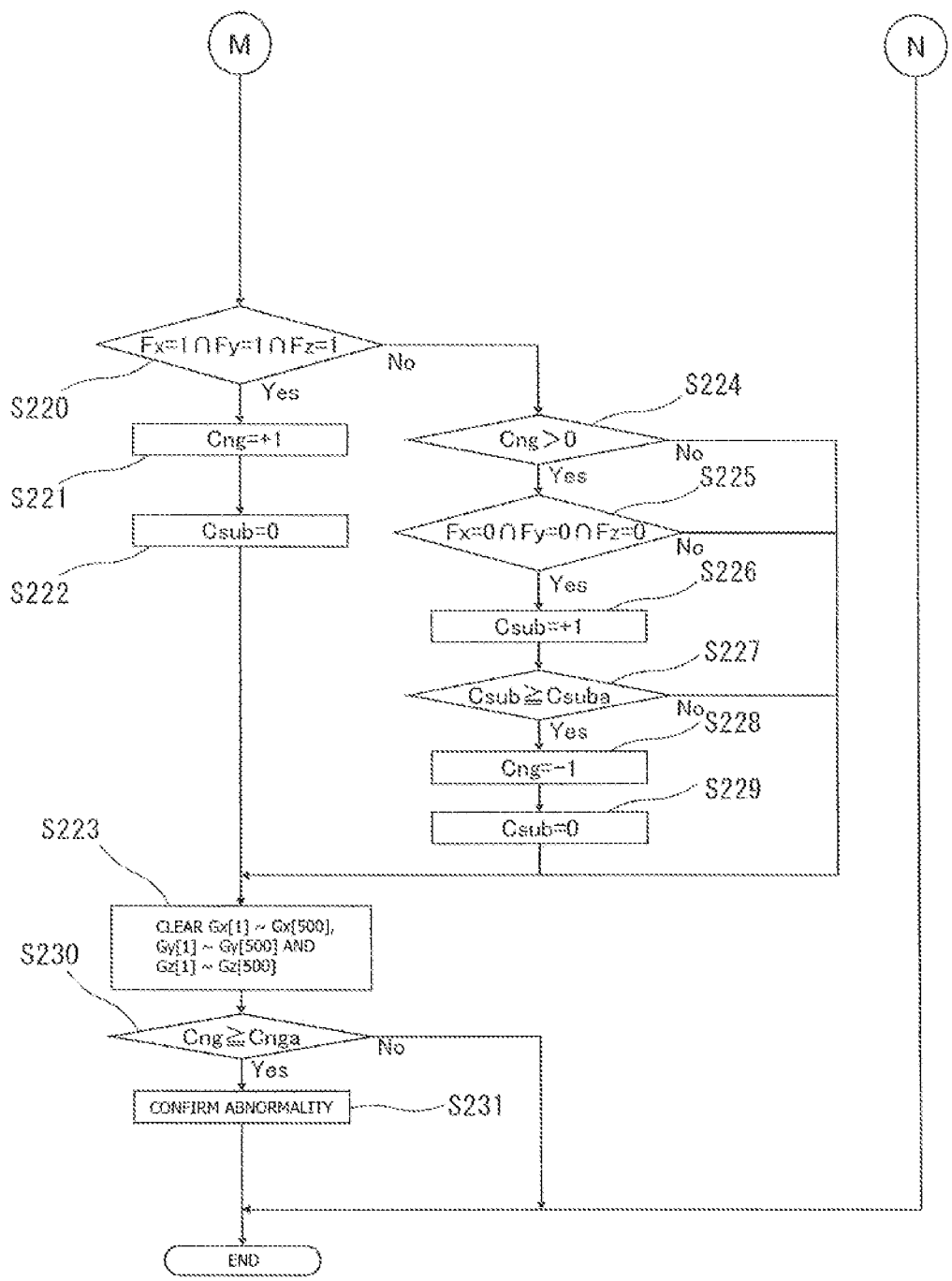
FIG. 27 is a flow chart showing a downstream part of the process of abnormality determination control of the power steering device according to the seventh embodiment.

FIGS. 25 to 27 show a seventh embodiment of the present invention where the abnormality determination control by control device 14 for the power steering device is based on X-axis acceleration signal Gx, Y-axis acceleration signal Gy, and Z-axis acceleration signal Gz obtained by sensing of acceleration sensor 37.

Specifically, as shown in FIG. 25, abnormality determination part 63 according to the present embodiment includes: a first direction abnormality determination part 77 configured to perform abnormality determination based on Y-axis acceleration signal Gy that is inputted via vibration signal receiving part 69 from acceleration sensor 37; a second direction abnormality determination part 78 configured to perform abnormality determination based on X-axis acceleration signal Gx that is inputted via vibration signal receiving part 69 from acceleration sensor 37; a third direction abnormality determination part 79 configured to perform abnormality determination based on Z-axis acceleration signal Gz that is inputted via vibration signal receiving part 69 from acceleration sensor 37; and a final abnormality determination part 80 configured to finally determine whether or not the power steering device becomes abnormal, based on a result of determination of each of first to third direction abnormality determination parts 77 to 79.

Final abnormality determination part 80 determines that the power steering device becomes abnormal, in response to a condition that each of first to third direction abnormality determination parts 77 to 79 determines that there is a possibility that the power steering device is abnormal, and sends a signal indicative the occurrence of abnormality to failsafe processing part 64.

FIGS. 26 and 27 show a flow chart showing a process of abnormality determination control by control device 14 for the power steering device according to the present embodiment.

Specifically, in the flow of abnormality determination control for the power steering device according to the present embodiment, it acquires X-axis acceleration signal Gx, Y-axis acceleration signal Gy, and Z-axis acceleration signal Gz (Step S201), and extracts a component of a frequency band of 200 Hz and higher of each acceleration signal Gx, Gy, Gz by high-pass filtering (Step S202), and stores past 1000-times X-axis acceleration signals Gx[1] to Gx[1000], past 1000-times Y-axis acceleration signals Gy[1] to Gy[1000], and past 1000-times Z-axis acceleration signals Gz[1] to Gz[1000]. Next, it determines whether or not the storing of signals at Steps S207 to S209 is completed (Step S204). In case of No at Step S204, control device 14 terminates the present program without performing the abnormality determination by abnormality determination part 63 for the power steering device. In case of Yes at Step S204, it performs in parallel an abnormality determination operation for the power steering device based on X-axis acceleration signal Gx, and an abnormality determination operation for the power steering device based on Y-axis acceleration signal Gy, and an abnormality determination operation for the power steering device based on Z-axis acceleration signal Gz.

During the abnormality determination operation based on X-axis acceleration signal Gx, it obtains an absolute value of each of past 1000-times X-axis acceleration signals Gx[1] to Gx[1000] (Step S205), and calculates average value Gx(Ave) of 1000-times X-axis acceleration signals Gx, based on the absolute values |Gx[1]| to |Gx[1000]| (Step S206), and thereafter determines whether or not average value Gx(Ave) is greater than or equal to abnormality determination threshold value Thx(Fix) that is a fixed value (Step S207). In case of Yes at Step S207, it sets an X-axis abnormality determination flag Fx (Step S208), and thereafter proceeds to Step S220 described below. In case of No at Step S207, it resets X-axis abnormality determination flag Fx (Step S209), and thereafter proceeds to Step S220.

During the abnormality determination operation based on Y-axis acceleration signal Gy, it obtains an absolute value of each of past 1000-times Y-axis acceleration signals Gy[1] to Gy[1000] (Step S210), and calculates average value Gy(Ave) of 1000-times Y-axis acceleration signals Gy, based on the absolute values |Gy[1]| to |Gy[1000]| (Step S211), and thereafter determines whether or not average value Gy(Ave) is greater than or equal to abnormality determination threshold value Thy(Fix) that is a fixed value (Step S212). In case of Yes at Step S212, it sets a Y-axis abnormality determination flag Fy (Step S213), and thereafter proceeds to Step S220 described below. In case of No at Step S212, it resets Y-axis abnormality determination flag Fy (Step S214), and thereafter proceeds to Step S220.

During the abnormality determination operation based on Z-axis acceleration signal Gz, it obtains an absolute value of each of past 1000-times Z-axis acceleration signals Gz[1] to Gz[1000] (Step S215), and calculates average value Gz(Ave) of 1000-times Z-axis acceleration signals Gz, based on the absolute values |Gz[1]| to |Gz[1000]| (Step S216), and thereafter determines whether or not average value Gz(Ave) is greater than or equal to abnormality determination threshold value Thz(Fix) that is a fixed value (Step S217). In case of Yes at Step S217, it sets a Z-axis abnormality determination flag Fz (Step S218), and thereafter proceeds to Step S220 described below. In case of No at Step S217, it resets Z-axis abnormality determination flag Fz (Step S219), and thereafter proceeds to Step S220.

At Step S220, it determines whether or not all of X-axis abnormality determination flag Fx, Y-axis abnormality determination flag Fy, and Z-axis abnormality determination flag Fz are set. In case of Yes at Step S220, it increments NG-counter Cng (Step S221), and clears subtraction counter Csub (Step S222). Subsequently, it clears an old half of each of 1000-times X-axis acceleration signals Gx[1] to Gx[1000], 1000-times Y-axis acceleration signals Gy[1] to Gy[1000], and 1000-times Z-axis acceleration signals Gz[1] to Gz[1000], namely, clears X-axis acceleration signals Gx[1] to Gx[500], Y-axis acceleration signals Gy[1] to Gy[500], and Z-axis acceleration signals Gz[1] to Gz[500] (Step S223), and thereafter proceeds to Step S230 described below.

In case of No at Step S220, it determines whether or not NG-counter Cng is greater than zero (Step S224). In case of No at Step S224, it proceeds to Step S223. On the other hand, in case of Yes at Step S224, it proceeds to Step S225.

At Step S225, it determines whether or not all of X-axis abnormality determination flag Fx, Y-axis abnormality determination flag Fy, and Z-axis abnormality determination flag Fz are in reset states. In case of No at Step S225, it proceeds to Step S223. On the other hand, in case of Yes at Step S225, it increments subtraction counter Csub (Step S226), and thereafter proceeds to Step S227.

At Step S227, it determines whether or not subtraction counter Csub is greater than predetermined value Csuba. In case of No at Step S227, it proceeds directly to Step S223. On the other hand, in case of Yes at Step S227, it decrements NG-counter Cng (Step S228), and resets subtraction counter Csub (Step S229), and thereafter proceeds to Step S223.

At Step S230, it determines whether or not NG-counter Cng is greater than or equal to predetermined value Cnga. In case of No at Step S230, it assumes that the power steering device does not become abnormal, and terminates the present program. On the other hand, in case of Yes at Step S230, it confirms that the power steering device becomes abnormal (Step S231), and then terminates the present program.

The feature of the present embodiment that control device 14 causes first to third direction abnormality determination parts 77 to 79 to perform abnormality determination based on the X-axis, Y-axis and Z-axis acceleration components, and causes final abnormality determination part 80 to determine that the power steering device becomes abnormal, when two or more of first to third direction abnormality determination parts 77 to 79 determine that the power steering device is abnormal, serves to suppress the occurrence of incorrect determination, as compared to a configuration where the abnormality determination is based only on a single axis acceleration component.

In particular, the feature of the present embodiment that final abnormality determination part 80 determines that the power steering device becomes abnormal, when all of first to third direction abnormality determination parts 77 to 79 determine that the power steering device is abnormal, serves to suppress the occurrence of incorrect determination with higher reliability.

Although the present embodiment is configured such that first to third direction abnormality determination parts 77 to 79 perform abnormality determination for all three axis vibration components occurring in housing 3, one of first to third direction abnormality determination parts 77 to 79 may be omitted, and abnormality determination for the power steering device may be based on the result of determination of the remaining two of first to third direction abnormality determination parts 77 to 79, if the accuracy of the abnormality determination is sufficiently ensured. This serves to reduce the load of calculation of microcomputer 34 for the abnormality determination for the power steering device.

It is preferable that the remaining two direction abnormality determination parts are combination of first direction abnormality determination part 77 and second direction abnormality determination part 78, where first direction abnormality determination part 77 performs abnormality determination based on Y-axis acceleration signal Gy that shows the most significant variation between normal state and abnormal state of the power steering device, and second direction abnormality determination part 78 performs abnormality determination based on X-axis acceleration signal Gx that shows the second most significant variation between normal state and abnormal state of the power steering device. This serves to provide more accurate abnormality determination, as compared to any other combination of two direction abnormality determination parts.

The present invention is not limited to the configurations of the embodiments described above, but may be modified without going out of the substance of the present invention.

The power steering device control devices according to the embodiments described above may be exemplified as follows.

According to one aspect, a power steering device control device for a power steering device, the power steering device including: a steering mechanism configured to transmit rotation of a steering wheel to a steered wheel; and an electric motor configured to apply a steering force to the steering mechanism; the power steering device control device includes: a command signal calculation part configured to: calculate a command signal for control of driving of the electric motor, based on a state of steering of the steering wheel; and output the command signal to the electric motor; a vibration signal receiving part configured to receive input of a signal of vibration of the power steering device; and an abnormality determination part configured to determine whether or not the power steering device is abnormal, based on the signal of vibration of the power steering device received by the vibration signal receiving part.

According to a preferable aspect, the power steering device control device further includes an acceleration sensor, wherein the vibration signal receiving part is configured to receive an output signal of the acceleration sensor.

According to another preferable aspect, the power steering device control device according to one of the foregoing aspects further includes a substrate on which a microcomputer is mounted, wherein: the abnormality determination part is included in the microcomputer; and the acceleration sensor is mounted on the substrate.

According to a further preferable aspect, the power steering device control device according to one of the foregoing aspects is configured such that: the substrate is housed in a housing, and includes a fixing portion fixed to the housing; and the acceleration sensor is located adjacent to the fixing portion.

According to a further preferable aspect, the power steering device control device according to one of the foregoing aspects is configured such that: the steering mechanism includes: a pinion shaft configured to rotate along with rotation of the steering wheel; and a rack shaft configured to travel in a vehicle lateral direction along with rotation of the pinion shaft; and the acceleration sensor is configured to sense at least a component of vibration in a direction of travel of the rack shaft.

According to a further preferable aspect, the power steering device control device according to one of the foregoing aspects is configured such that the acceleration sensor is configured to sense the component of vibration in the direction of travel of the rack shaft, and a component of vibration in a vehicle longitudinal direction.

According to a further preferable aspect, the power steering device control device according to one of the foregoing aspects is configured such that: the abnormality determination part includes: a first direction abnormality determination part configured to perform abnormality determination based on the component of vibration in the direction of travel of the rack shaft; a second direction abnormality determination part configured to perform abnormality determination based on the component of vibration in the vehicle longitudinal direction; and a final abnormality determination part configured to determine whether or not the power steering device is abnormal, based on a result of determination of the first direction abnormality determination part and a result of determination of the second direction abnormality determination part; and the final abnormality determination part is configured to determine that the power steering device is abnormal, in response to a condition that each of the result of determination of the first direction abnormality determination part and the result of determination of the second direction abnormality determination part indicates a possibility that the power steering device is abnormal.

According to a further preferable aspect, the power steering device control device according to one of the foregoing aspects is configured such that the acceleration sensor is configured to sense a dynamic acceleration and no static acceleration.

According to a further preferable aspect, the power steering device control device according to one of the foregoing aspects is configured such that the abnormality determination part is configured to determine whether or not the power steering device is abnormal, based on a component of the signal of vibration having a frequency of 200 Hz or higher.

According to a further preferable aspect, the power steering device control device according to one of the foregoing aspects is configured such that the abnormality determination part is configured to determine whether or not the power steering device is abnormal, based on a component of the signal of vibration having a frequency of 400 Hz or higher.

According to a further preferable aspect, the power steering device control device according to one of the foregoing aspects is configured such that the abnormality determination part is configured to determine whether or not the power steering device is abnormal, based on a component of the signal of vibration having a frequency of 800 Hz or lower.

According to a further preferable aspect, the power steering device control device according to one of the foregoing aspects further includes a steering operation determination part configured to determine whether or not steering operation is being performed, wherein the abnormality determination part is configured to determine whether or not the power steering device is abnormal, based on the signal of vibration when the steering operation determination part determines that steering operation is being performed.

According to a further preferable aspect, the power steering device control device according to one of the foregoing aspects further includes a microcomputer, wherein: the abnormality determination part is included in the microcomputer; the vibration signal receiving part is included in the microcomputer; and the microcomputer is configured to cause the abnormality determination part to perform abnormality determination about the power steering device, only when the steering operation determination part determines that steering operation is being performed.

According to a further preferable aspect, the power steering device control device according to one of the foregoing aspects is configured such that the steering operation determination part is configured to determine that steering operation is being performed, in response to a condition that a steering speed is higher than a predetermined value, wherein the steering speed is a rotational speed of the steering wheel.

According to a further preferable aspect, the power steering device control device according to one of the foregoing aspects is configured such that: the abnormality determination part is configured to determine whether or not the power steering device is abnormal, based on comparison between the signal of vibration and an abnormality determination threshold value; and the signal of vibration is corrected depending on the steering speed signal.

According to a further preferable aspect, the power steering device control device according to one of the foregoing aspects is configured such that: the signal of vibration is normalized so as to cancel an effect of the steering speed signal; and the abnormality determination part is configured to determine that the power steering device is abnormal, in response to a condition that the normalized signal of vibration is greater than the abnormality determination threshold value.

According to a further preferable aspect, the power steering device control device according to one of the foregoing aspects further includes an acceleration sensor, wherein the abnormality determination part is configured to determine that the power steering device is abnormal, in response to a condition that a normalized value of the signal of vibration is greater than the abnormality determination threshold value, wherein the normalized value is obtained by dividing an output signal of the acceleration sensor by the steering speed signal, and multiplying the divided output signal by a factor.

According to a further preferable aspect, the power steering device control device according to one of the foregoing aspects is configured such that the abnormality determination part is configured to determine whether or not the power steering device is abnormal, based on a frequency of occurrence of a condition that the signal of vibration or an average value of the signal of vibration during a predetermined time period exceeds a predetermined value.

According to a further preferable aspect, the power steering device control device according to one of the foregoing aspects is configured such that the abnormality determination part is configured to determine whether or not the power steering device is abnormal, based on a frequency of occurrence of a condition that the signal of vibration or an average value of the signal of vibration during a past predetermined time period exceeds the predetermined value.

According to a further preferable aspect, the power steering device control device according to one of the foregoing aspects is configured such that: the abnormality determination part is configured to determine whether or not the power steering device is abnormal, based on comparison between the signal of vibration and an abnormality determination threshold value; and the abnormality determination threshold value is controlled variably depending on vehicle speed.

The invention claimed is:

1. A power steering device control device for a power steering device,
   the power steering device including:
       a steering mechanism configured to transmit rotation of a steering wheel to a steered wheel; and
       an electric motor configured to apply a steering force to the steering mechanism;
   the power steering device control device comprising:
       a command signal calculation part configured to:
           calculate a command signal for control of driving of the electric motor, based on a state of steering of the steering wheel; and
           output the command signal to the electric motor;
       a vibration signal receiving part configured to receive input of a signal of vibration of the power steering device;
       an abnormality determination part configured to determine whether or not the power steering device is abnormal, based on the signal of vibration of the power steering device received by the vibration signal receiving part;
       a steering operation determination part configured to determine whether or not steering operation is being performed,
   wherein the abnormality determination part is configured to determine whether or not the power steering device is abnormal, based on the signal of vibration when the steering operation determination part determines that steering operation is being performed; and
       an acceleration sensor, wherein the vibration signal receiving part is configured to receive an output signal of the acceleration sensor,
   wherein:
       the steering mechanism includes:
           a pinion shaft configured to rotate along with rotation of the steering wheel; and
           a rack shaft configured to travel in a vehicle lateral direction along with rotation of the pinion shaft and
       the acceleration sensor is configured to sense at least a component of vibration in a direction of travel of the rack shaft, wherein the acceleration sensor is configured to sense the component of vibration in the direction of travel of the rack shaft, and a component of vibration in a vehicle longitudinal direction, wherein:
the abnormality determination part includes:
a first direction abnormality determination part configured to perform abnormality determination based on the component of vibration in the direction of travel of the rack shaft
a second direction abnormality determination part configured to perform abnormality determination based on the component of vibration in the vehicle longitudinal direction; and
a final abnormality determination part configured to determine whether or not the power steering device is abnormal, based on a result of determination of the first direction abnormality determination part and a result of determination of the second direction abnormality determination part; and
the final abnormality determination part is configured to determine that the power steering device is abnormal, in response to a condition that each of the result of determination of the first direction abnormality determination part and the result of determination of the second direction abnormality determination part indicates a possibility that the power steering device is abnormal.

2. The power steering device control device as claimed in claim 1, wherein:
the abnormality determination part is configured to determine whether or not the power steering device is abnormal, based on comparison between the signal of vibration and an abnormality determination threshold value; and
the abnormality determination threshold value is controlled variably depending on vehicle speed.

3. The power steering device control device as claimed in claim 1, further comprising a substrate on which a microcomputer is mounted, wherein:
the abnormality determination part is included in the microcomputer; and
the acceleration sensor is mounted on the substrate.

4. The power steering device control device as claimed in claim 3, wherein:
the substrate is housed in a housing, and includes a fixing portion fixed to the housing; and
the acceleration sensor is located adjacent to the fixing portion.

5. The power steering device control device as claimed in claim 1, wherein the abnormality determination part is configured to determine whether or not the power steering device is abnormal, based on a frequency of occurrence of a condition that the signal of vibration or an average value of the signal of vibration during a predetermined time period exceeds a predetermined value.

6. The power steering device control device as claimed in claim 5, wherein the abnormality determination part is configured to determine whether or not the power steering device is abnormal, based on a frequency of occurrence of a condition that the signal of vibration or an average value of the signal of vibration during a past predetermined time period exceeds the predetermined value.

7. The power steering device control device as claimed in claim 1, further comprising a microcomputer, wherein:
the abnormality determination part is included in the microcomputer;
the vibration signal receiving part is included in the microcomputer; and
the microcomputer is configured to cause the abnormality determination part to perform abnormality determination about the power steering device, only when the steering operation determination part determines that steering operation is being performed.

8. The power steering device control device as claimed in claim 1, wherein the acceleration sensor is configured to sense a dynamic acceleration and no static acceleration.

9. The power steering device control device as claimed in claim 1, wherein the abnormality determination part is configured to determine whether or not the power steering device is abnormal, based on a component of the signal of vibration having a frequency of 200 Hz or higher.

10. The power steering device control device as claimed in claim 9, wherein the abnormality determination part is configured to determine whether or not the power steering device is abnormal, based on a component of the signal of vibration having a frequency of 400 Hz or higher.

11. The power steering device control device as claimed in claim 10, wherein the abnormality determination part is configured to determine whether or not the power steering device is abnormal, based on a component of the signal of vibration having a frequency of 800 Hz or lower.

12. A power steering device control device for a power steering device, the power steering device including:
a steering mechanism configured to transmit rotation of a steering wheel to a steered wheel; and
an electric motor configured to apply a steering force to the steering mechanism;
the power steering device control device comprising:
a command signal calculation part configured to:
calculate a command signal for control of driving of the electric motor, based on a state of steering of the steering wheel; and
output the command signal to the electric motor;
a vibration signal receiving part configured to receive input of a signal of vibration of the power steering device;
an abnormality determination part configured to determine whether or not the power steering device is abnormal, based on the signal of vibration of the power steering device received by the vibration signal receiving part;
a steering operation determination part configured to determine whether or not steering operation is being performed,
wherein the abnormality determination part is configured to determine whether or not the power steering device is abnormal, based on the signal of vibration when the steering operation determination part determines that steering operation is being performed,
wherein the steering operation determination part is configured to determine that steering operation is being performed, in response to a condition that a steering speed is higher than a predetermined value, wherein the steering speed is a rotational speed of the steering wheel,
wherein the abnormality determination part is configured to determine whether or not the power steering device is abnormal, based on comparison between the signal of vibration and an abnormality determination threshold value; and
the signal of vibration is corrected depending on the steering speed signal, wherein the signal of vibration is normalized so as to cancel an effect of the steering speed signal; and the abnormality determination part is configured to determine that the power steering device is abnormal, in response to a condition that the normalized signal of vibration is greater than the abnormality determination threshold value.

13. A power steering device control device for a power steering device, the power steering device including:
- a steering mechanism configured to transmit rotation of a steering wheel to a steered wheel; and
- an electric motor configured to apply a steering force to the steering mechanism;

the power steering device control device comprising:
- a command signal calculation part configured to:
  - calculate a command signal for control of driving of the electric motor, based on a state of steering of the steering wheel; and
  - output the command signal to the electric motor;
- a vibration signal receiving part configured to receive input of a signal of vibration of the power steering device;
- an abnormality determination part configured to determine whether or not the power steering device is abnormal, based on the signal of vibration of the power steering device received by the vibration signal receiving part;
- a steering operation determination part configured to determine whether or not steering operation is being performed, wherein the abnormality determination part is configured to determine whether or not the power steering device is abnormal, based on the signal of vibration when the steering operation determination part determines that steering operation is being performed, wherein the steering operation determination part is configured to determine that steering operation is being performed, in response to a condition that a steering speed is higher than a predetermined value, wherein the steering speed is a rotational speed of the steering wheel, wherein the abnormality determination part is configured to determine whether or not the power steering device is abnormal, based on comparison between the signal of vibration and an abnormality determination threshold value; and the signal of vibration is corrected depending on the steering speed signal; and an acceleration sensor, wherein the abnormality determination part is configured to determine that the power steering device is abnormal, in response to a condition that a normalized value of the signal of vibration is greater than the abnormality determination threshold value, wherein the normalized value is obtained by dividing an output signal of the acceleration sensor by the steering speed signal, and multiplying the divided output signal by a factor.

\* \* \* \* \*